(12) United States Patent
Ota et al.

(10) Patent No.: US 10,137,527 B2
(45) Date of Patent: Nov. 27, 2018

(54) LASER-BASED MODIFICATION OF TRANSPARENT MATERIALS

(71) Applicant: IMRA America, Inc., Ann Arbor, MI (US)

(72) Inventors: Michiharu Ota, Ann Arbor, MI (US); Alan Y. Arai, Fremont, CA (US); Zhenlin Liu, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 168 days.

(21) Appl. No.: 15/208,374

(22) Filed: Jul. 12, 2016

(65) Prior Publication Data

US 2016/0318122 A1 Nov. 3, 2016

Related U.S. Application Data

(63) Continuation of application No. PCT/US2015/011420, filed on Jan. 14, 2015.
(Continued)

(51) Int. Cl.
*B23K 26/06* (2014.01)
*B23K 26/38* (2014.01)
(Continued)

(52) U.S. Cl.
CPC ...... *B23K 26/0624* (2015.10); *B23K 26/0604* (2013.01); *B23K 26/082* (2015.10);
(Continued)

(58) Field of Classification Search
CPC ....... B23K 26/36; B23K 26/362; B23K 26/38
(Continued)

(56) References Cited

U.S. PATENT DOCUMENTS 4,328,410 A 5/1982 Slivinsky et al.
5,552,452 A 9/1996 Khadem et al.
(Continued)

FOREIGN PATENT DOCUMENTS

EP 1959292 A2 8/2008
EP 2458750 A2 5/2012
(Continued)

OTHER PUBLICATIONS

Ahmed et al.., "Display glass cutting by femtosecond laser induced single shot periodic void array", Applied Physics, Oct. 2008, 93, pp. 189-192.
(Continued)

*Primary Examiner* — Samuel M Heinrich
(74) *Attorney, Agent, or Firm* — Knobbe, Martens, Olson & Bear, LLP

(57) ABSTRACT

In certain embodiments a method and system for laser-based material processing of a material is disclosed. In at least one preferred implementation temporally overlapping pulse series are generated with separate pulsed laser sources, for example nanosecond (NS) and ultrashort pulse (USP) sources (NS-USP). Pulses are delivered to the material as a series of spatially and temporally overlapping pulse pairs. The material can, but need not, be a transparent material. In some applications of transparent material processing, it was found the combination of pulses both substantially more material modification and high machining quality than obtainable with either individual pulse series taken alone. Other micromachining methods and arrangement are disclosed for formation of fine features on or within a substrate. Such methods and arrangements may generally be applied with a NS-USP combination, or with other sources.

21 Claims, 15 Drawing Sheets

Related U.S. Application Data

(60) Provisional application No. 61/928,979, filed on Jan. 17, 2014.

(51) Int. Cl.

| | |
|---|---|
| *B23K 26/0622* | (2014.01) |
| *B23K 26/36* | (2014.01) |
| *B23K 26/364* | (2014.01) |
| *B23K 26/082* | (2014.01) |
| *B23K 26/40* | (2014.01) |
| *B23K 26/382* | (2014.01) |
| *B23K 26/402* | (2014.01) |
| *C03B 33/10* | (2006.01) |
| *B23K 103/00* | (2006.01) |

(52) U.S. Cl.
CPC ............ *B23K 26/36* (2013.01); *B23K 26/364* (2015.10); *B23K 26/38* (2013.01); *B23K 26/382* (2015.10); *B23K 26/40* (2013.01); *B23K 26/402* (2013.01); *C03B 33/102* (2013.01); *B23K 2203/50* (2015.10); *B23K 2203/54* (2015.10)

(58) Field of Classification Search
USPC ........................................ 219/121.68, 121.72
See application file for complete search history.

(56) References Cited

U.S. PATENT DOCUMENTS

| | | |
|---|---|---|
| 5,756,924 A | 5/1998 | Early |
| 5,837,964 A | 11/1998 | Emer et al. |
| 5,862,287 A | 1/1999 | Stock et al. |
| 6,042,603 A | 3/2000 | Fisher et al. |
| 6,809,291 B1* | 10/2004 | Neil .................. B23K 26/0613 219/121.68 |
| 7,131,968 B2 | 11/2006 | Bendett et al. |
| 7,303,977 B2 | 12/2007 | Voronov et al. |
| 7,486,705 B2 | 2/2009 | Shah et al. |
| 7,491,909 B2 | 2/2009 | Yamamoto et al. |
| 7,626,138 B2 | 12/2009 | Bovatsek et al. |
| 7,684,450 B2 | 3/2010 | Shah et al. |
| 8,040,929 B2 | 10/2011 | Imeshev et al. |
| 8,158,493 B2 | 4/2012 | Shah et al. |
| 8,778,121 B2 | 7/2014 | Tuennermann et al. |
| 2002/0158052 A1 | 10/2002 | Ehrmann et al. |
| 2004/0134894 A1* | 7/2004 | Gu .......................... B23K 26/04 219/121.68 |
| 2005/0000952 A1 | 1/2005 | Harter |
| 2005/0150880 A1 | 7/2005 | Gu et al. |
| 2005/0218122 A1 | 10/2005 | Yamamoto et al. |
| 2005/0226287 A1 | 10/2005 | Shah et al. |
| 2006/0091125 A1 | 5/2006 | Li et al. |
| 2007/0215820 A1* | 9/2007 | Cordingley .......... B23K 26/032 250/492.22 |
| 2007/0290145 A1 | 12/2007 | Viellerobe et al. |
| 2008/0112709 A1 | 5/2008 | Oulianov et al. |
| 2009/0141750 A1 | 6/2009 | Sun et al. |
| 2010/0025387 A1 | 2/2010 | Arai et al. |
| 2010/0047587 A1 | 2/2010 | Itoh et al. |
| 2011/0062127 A1* | 3/2011 | Gu .......................... B23K 26/04 219/121.69 |
| 2013/0008880 A1 | 1/2013 | Ota |
| 2013/0083816 A1 | 4/2013 | Kubo |
| 2013/0289546 A1* | 10/2013 | Stoltz ..................... A61B 18/20 606/11 |
| 2014/0217058 A1* | 8/2014 | Boegli ............... B23K 26/0084 216/9 |
| 2015/0089978 A1 | 4/2015 | Dai et al. |

FOREIGN PATENT DOCUMENTS

| | | |
|---|---|---|
| EP | 1631223 B1 | 7/2013 |
| JP | 2003-205383 A | 7/2003 |
| JP | 4230826 B2 | 2/2009 |
| JP | 4709482 B2 | 6/2011 |
| WO | WO 2007/100176 A1 | 9/2007 |
| WO | WO 2011/037787 A1 | 3/2011 |
| WO | WO 2012/006736 A2 | 1/2012 |
| WO | WO 2015/108991 A1 | 7/2015 |
| WO | WO 2015/130651 A1 | 9/2015 |

OTHER PUBLICATIONS

Akturk, Selcuk, "Tailored-Beam Ultrashort Laser Pulses", Quantum Physics Letters, vol. 1, No. 3, published online Dec. 1, 2012, pp. 97-112.

Ashcom, Jonathan Benjamin, "The role of focusing in the interaction of femtosecond laser pulses with transparent materials", The Department of Physics, Harvard University, Jan. 2003, in 158 pages.

Bengtsson et al., "Picosecond lasers come of age for micromachining", Industrial Laser Solutions for Manufacturing, The International Resourse for Laser Materials Processing, http://www.industrial-lasers.com/articles/print/volume-28/issue-3/features/picosecond-lasers-come-of-age-for-micromachining.html, May 1, 2013, in 7 pages.

Bovatsek et al., "DPSS Lasers Overcome Glass Process Challenges", Photonics Spectra, Sep. 2012, pp. 50-54.

Dhar et al., "A review on laser drilling and its Techniques", Proceedings: International Conference on Advances in Mechanical Engineering, Dec. 1-3, 2006, India, in 6 pages.

Eaton et al., "Chapter 1—Fundamentals of Femtosecond Laser Modification of Bulk Dielectrics", Femtosecond Laser Micromachining, vol. 123 of the series Topics in Applied Physics 123, Dec. 26, 2011, pp. 3-18.

Fan et al., "Plasma Absorption of Femtosecond Laser Pulses in Dielectrics", Journal of Heat Transfer vol. 124, Apr. 2002, pp. 275-283.

Li et al., "Effect of plasma on ultrashort pulse laser material processing", Journal of Laser Applications, vol. 19, No. 1 , Feb. 2007, pp. 26-31.

Lin et al., "Investigations of femtosecond—nanosecond dual-beam laser ablation of dielectrics", Optics Letters, vol. 35, No. 14, Jul. 15, 2010, pp. 2490-2492.

Méjean et al., "Improved laser triggering and guiding of meqavolt discharges with dual fs-ns. pulses", Applied Physics Letters 021101, 2006, pp. 88-90.

Perry et al., "Chapter 13: Hole Drilling—13.5 Ultrashort-Pulse Laser Machining", LIA Handbook of Laser Materials Processing, 2001, in 12 pages.

Schaffer et al., "Thresholds for femtosecond laser-induced breakdown in bulk transparent solids and water", Proc. SPIE 3451, Time Structure of X-Ray Sources and Its Applications, 2, Dec. 1, 1998, in 7 pages.

Shah, et al., "Self-Focusing During Femtosecond Micromachining of Silicate Glasses", IEEE Journal of Quantum Electronics, vol. 40 , No. 1, Jan. 2004, pp. 57-68.

International Search Report and Written Opinion in corresponding International Patent Application No. PCT/US2015/011420, dated Aug. 31, 2015, in 12 pages.

International Preliminary Report on Patentability in corresponding International Patent Application No. PCT/US2015/011420, dated Jul. 28, 2016, in 9 pages.

Bovatsek, J. et al., "Three-Dimensional Micromachining Inside Transparent Materials Using Femtosecond Laser Pulses: New Applications", CLEO 2006, paper CThEE6, May 2006, in 2 pages.

Bovatsek, J. et al., "Ultrashort pulse micromachining with the 10-µJ FCPA fiber laser," in Fiber Lasers III: Tech., Sys., and Apps., Proc. of SPIE, vol. 6102, pp. 610201-1 to 610201-11, Feb. 2006.

Richter, S. et al., "Ultrashort pulse laser welding of glasses without optical contacting," Frontiers in Ultrafast Optics: Biomed., Sci., and Ind. Apps. XVII, Proc. of SPIE vol. 10094, pp. 1009411-1 to 1009411-8, Mar. 2017.

Shah, L., et al., "Compact 50W ultrashort pulse fiber laser for precision and high-speed material processing," Fiber Lasers IV:

(56) References Cited

OTHER PUBLICATIONS

Tech., Sys., and Apps., Proc. of SPIE vol. 6453, pp. 64530Z-1 to 64530Z-6, Feb. 2007.

* cited by examiner

LASER-BASED MODIFICATION OF TRANSPARENT MATERIALS

CROSS-REFERENCE TO RELATED APPLICATIONS

This application is a continuation of international application no. PCT/US2015/011420, filed Jan. 14, 2015, entitled "LASER-BASED MODIFICATION OF TRANSPARENT MATERIALS," which claims the benefit of priority to U.S. Provisional Patent Application No. 61/928,979, filed Jan. 17, 2014, entitled "LASER-BASED MODIFICATION OF TRANSPARENT MATERIALS;" each of which is hereby incorporated by reference herein in its entirety.

BACKGROUND

Field

This disclosure generally relates to processing of materials using pulsed lasers. Various implementations generally can be used for drilling, cutting, scribing, dicing, singulating, or otherwise processing materials such as transparent substrates, glasses, multilayer transparent materials, and so forth. Various implementations generally can be used for processing non-transparent materials.

Description of Related Art

Cutting of optically transparent materials is often done with mechanical methods. Perhaps the most common method for cutting thin, flat materials is using a mechanical dicing saw. This is the standard method in the microelectronics industry for dicing silicon wafers. However, this method generates significant debris that must be managed in order to avoid parts contamination, resulting in increased overall cost of the process. In addition, the thinner wafers being used for advanced microprocessor designs tend to shatter when cut with a dicing saw.

SUMMARY

An on-going need exists for high speed and high quality processing of transparent materials, for example: drilling of fine pitch, closely spaced holes, formation of kerfs and trenches, laser cutting, and other micromachining applications which include controlled modification of target material on a microscopic scale.

Various systems and methods are disclosed for laser-based processing of transparent materials (and/or non-transparent and/or partially transparent materials). As used herein, processing is used in its ordinary and general sense and includes, but is not limited to, drilling, cutting, scribing, dicing, grooving, milling, trepanning, and/or singulating. Processing a material can include (but is not limited to) micromachining the material, forming kerfs or trenches in or on the material, physically modifying the material (e.g., altering the refractive index and/or modifying a surface of the material), removing matter from the material, internally welding one or more materials, and so forth.

Embodiments of the systems and methods can be used for processing materials such as transparent substrates, glasses, multilayer transparent materials, and so forth. Such materials include, but are not limited to: display glass (e.g., glass with a chemically-strengthened, compression surface layer), sapphire, fused silica, quartz crown glass, tempered glass, non-tempered glass, soda lime glass, non-alkali glass, silicon carbide (SiC), silicon, etc. The systems and methods are not limited to processing transparent materials. In various embodiments, the systems and methods can be used for processing transparent, partially transparent, translucent, semi-opaque, opaque, and/or non-transparent materials.

In one example aspect the present disclosure features a method for laser-based material processing of a material. It was discovered, for example, that temporally and spatially overlapping a series of nanosecond pulses from a nanosecond pulse (NS) laser source with a series of ultrashort pulses from an ultrashort pulse (USP) laser source can result in both substantially more depthwise material modification and high machining quality than obtainable with either individual pulse series alone (NS-USP). In at least one embodiment temporally overlapping pulse series are generated with separate NS and USP sources. In some embodiments the pulses may be slightly offset in time, for example an ultrashort pulse may lead a nanosecond pulse by a few nanoseconds or more, provided a cooperative material interaction occurs which results in a controlled increase in depthwise material modification. The pulses are delivered to the material as a series of spatially and temporally overlapping pulse pairs, incident on the material along a common propagation direction, and may be collinear and spatially aligned.

In another example aspect, the present disclosure features a micromachining method which includes a pre-processing step in which ultrashort pulses are used to form a surface groove in a transparent material prior to applying a series of pulse pairs from the NS and USP sources. It was determined such a method can be advantageous for operation with some embodiments of micromachining.

In another example aspect the present disclosure features a method of laser-based micromachining which includes: irradiating a transparent material with focused laser pulses to form closely spaced features on or within said transparent material. By way of example, the closely spaced features may be an array of fine pitch holes. In some embodiments a drilling path is utilized in which at least some consecutively formed holes are separated by more than a nearest neighbor distance to limit heat accumulation effects.

In another example aspect, a laser-based system is provided for carrying out at least any or all of the above methods.

BRIEF DESCRIPTION OF THE DRAWINGS

FIG. 9A shows a drilled hole with an enlarged view illustrated in FIG. 9B

Figure 1A:
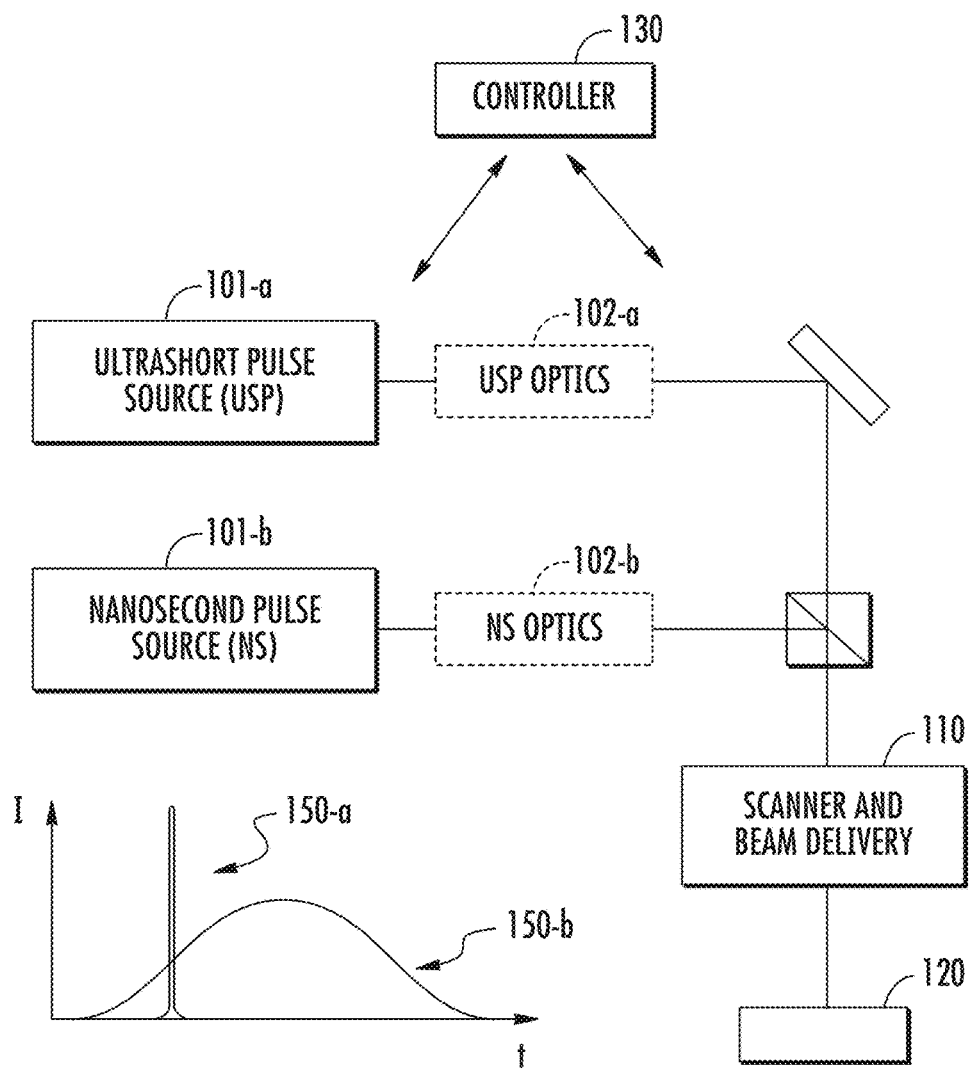
FIG. 1A schematically illustrates an example arrangement of a laser-based material processing system which utilizes temporally overlapping pulses from multiple laser sources to drill holes, cut, scribe, or otherwise modify a material. The material can, but need not, be a transparent material.

The figures depict various embodiments of the present disclosure for purposes of illustration and are not intended to be limiting. Alternative embodiments of the systems and methods illustrated herein may be employed without departing from the principles described herein. Additional figures schematically illustrating additional embodiments of the disclosure are included in the various patents, patent publications, and patent applications incorporated by reference herein. Reference will now be made in detail to several embodiments, examples of which are illustrated in the accompanying figures. It is noted that wherever practicable similar or like reference numbers may be used in the figures and may indicate similar or like functionality.

DETAILED DESCRIPTION

Overview

The following patents, published patent applications, and non-patent publications are pertinent to the present disclosure:

U.S. Pat. No. 4,328,410, ('410), "Laser skiving system";
U.S. Pat. No. 5,756,924, ('924), "Multiple laser pulse ignition method and apparatus";
U.S. Pat. No. 7,303,977, ('977), "Laser micromachining method";
U.S. Pat. No. 7,491,909, ('909), "Pulsed laser processing with controlled thermal and physical alterations";
U.S. Pat. No. 7,486,705, ('705), "Femtosecond laser processing system with process parameters, controls and feedback";
U.S. Pat. No. 7,626,138, ('138), "Transparent material processing with an ultrashort pulse laser";
U.S. Pat. No. 8,158,493, ('493), "Laser-based material processing methods and systems";
U.S. Patent Application Pub. No. 2002/0158052, ('8052), "Method and system for processing one or more microstructures of a multi-material device";
U.S. Patent Application Pub. No. 2005/0000952, ('0952), "Focusless micromachining";
U.S. Patent Application Pub. No. 2005/0150880, ('0880), "Laser-based method and system for memory link processing with picosecond lasers";
U.S. Patent Application Pub. No. 2009/0141750, ('1750), "Systems and methods for link processing with ultrafast and nanosecond laser pulses";
U.S. Patent Application Pub. No. 2010/0025387, ('5387), "Transparent material processing with an ultrashort pulse laser";
U.S. Patent Application Pub. No. 2011/0240617, ('0617), "Laser-based material processing apparatus and methods";
U.S. Patent Application Pub. No. 2013/0008880, ('8880), "Pulse laser device, transparent member welding method and transparent member welding apparatus";
U.S. Patent Application Pub. No. 2013/0183837, ('3837), "Methods and systems for laser processing of coated substrates";
PCT Patent Application Pub. No. WO 2012006736, ('6736), "Method of Material Processing by Laser Filamentation";
Perry et al., "Ultra-short pulse laser drilling", Chapter 13, Hole Drilling pp. 499-508, LIA Handbook of Laser Materials Processing, Ed: J. F. Ready, copyright 2001 by Laser Institute Of America;
Fan et al., "Plasma Absorption of Femtosecond Laser Pulses in Dielectric", J. Heat Transfer, Vol. 123, pp. 275-283. April 2002;
Shah et al., "Self-Focusing During femtosecond micromachining of Silicate Glasses", JQE Vol. 40, No. 1, January 2004, pp. 57-68;
Méjean et al., "Improved laser triggering and guiding of megavolt discharges with dual fs-ns pulses", Applied Physics Letters p. 88, 021101 (2006);
S. Dhar et al., "A review on laser drilling and its Techniques", Proceedings Intn'l Conference on Advances in Mechanical Engineering-2006 AME 2006, Dec. 1-3, 2006 India;
Li et al., "Effect of plasma on ultrashort pulse laser material processing", Journal of laser applications, Volume 19, Number 1, pp. 26-31, February 2007;
Ahmed et al., "Display glass cutting by femtosecond laser induced single shot periodic void array", Appl. Phys. A (2008) 93, pp. 189-192;
Akturk et al., "Tailored-Beam Ultrashort Laser Pulses", Quant. Physics Letters 1, No. 3, pp. 97-112, 2012;
Eaton, "Fundamentals of Femtosecond Laser Modification of Bulk Dielectrics", Chapter 1, Shane Eaton, G. Cerullo, R. Osellame, from R. Osellame et al. (eds.), Femtosecond Laser Micromachining, Topics in Applied Physics 123, DOI 10.1007/978-3-642-23366-11, pp. 3-18 (2012);

Bovatsek et al., "DPSS Lasers Overcome Glass Process Challenges", Photonics Spectra, September 2012;

Bengtsson et al., "Picosecond lasers come of age for micromachining", Industrial Laser Solutions, available online May 1, 2013, http://www.industrial-lasers.com/articles/print/volume-28/issue-3/features/picosecond-lasers-come-of-age-for-micromachining.html.

In accordance with various embodiments a method and system for laser-based material processing of a material is disclosed. In at least one preferred implementation temporally overlapping pulse series are generated with separate nanosecond pulse laser source (NS) and ultrashort pulse laser source (USP). The pulses are delivered to the material as a series of spatially and temporally overlapping pulse pairs incident along a common propagation direction. The material can, but need not be, a transparent material. Although many examples described herein are related to processing transparent materials, this is not a limitation, and in other examples, other types of materials can be processed (e.g., non-transparent materials).

In applications of transparent material processing it was found the combination of NS-USP can provide both substantially more material modification and high machining quality than obtainable with either individual pulse series taken alone.

Additionally, numerous other micromachining methods and arrangements are disclosed herein, including: advantageous machining paths which allow for decreased feature spacing while maintaining high throughput, and the effects of spatial registration between multiple pulsed laser beams which are to cooperatively improve material processing performance. In some embodiments, such methods and arrangements may be applied with a NS-USP combination, or with use of individual NS or USP sources, or with other laser systems used for material processing, particularly micromachining.

Example Systems and Methods for Laser-Based Material Processing

FIG. 1A illustrates an example arrangement of a laser-based material processing system which utilizes temporally overlapping pulses from multiple laser sources to drill holes, cut, scribe, or otherwise modify a material 120. The material can, but need not, be a transparent material. In at least one embodiment the multiple pulses include overlapping pulses 150-*a*, 150-*b*. Pulse 150-*b* may have a pulse width in the nanosecond (ns) range. Pulse 150-*b* is generally much longer than pulse 150-*a*, for example at least 10-times, at least 100-times longer, or at least 1000-times longer, with 150-*a* being an ultrashort pulse having a pulse width in the femtosecond (fs) or low picosecond (ps) range, for example below about 100 ps and above about 100 fs. In a preferred implementation pulse 150-*a* will irradiate the sample at a time corresponding to about the 50% point of the rising edge of the ns pulse, for reasons which will be discussed below. In some implementations the USP (e.g. fs pulse) may be spaced to lead (e.g.: precede) the NS pulse by a few ns, for example, up to 3 ns, 5 ns, or 10 ns, provided a suitable material interaction occurs.

Ultrashort pulse source 101-*a* (USP) may include any arrangement capable of generating ultrashort pulses having suitable pulse characteristics for modifying transparent material. Pulse 150-*a* energy may be in the range from about 0.5 or 1 microJoule (μJ) up to about 20 μJ, 50 μJ, 100 μJ, or in certain embodiments up to about 1 milliJoule (mJ). A pulse energy may be selected based on the fluence (Joules/cm$^2$) and/or intensity (W/cm$^2$) appropriate for modification of material 120. Ultrashort pulse 150-*a* characteristics may include a pulse width in the range from about 100 fs to 10 ps, 100 fs to 100 ps, 1 ps to 100 ps, or similar ranges. In at least one preferred implementation a pulse width in the range from about 100 fs to about 1 ps may be utilized. Intensity may be in the range from about 0.25×10$^{12}$ W/cm$^2$ up to about 10$^{13}$ W/cm$^2$, and the fluence may be determined from the pulse width and intensity. The fluence may exceed a single-shot ablation threshold for the transparent material at an operating wavelength, or the single pulse fluence may be somewhat less than a single shot threshold and characterized relative to a reduced multiple pulse threshold. In a preferred implementation a fiber-based chirped pulse amplification (FCPA) system may be utilized to generate ultrashort pulses with peak power in the range from about 1 MW to 20 MW, sub-picosecond pulses (e.g.: 100 fs-1 ps), and pulse energy at about 20 μJ. A pulse repetition rate may be in the range from about 100 kHz to about 5 MHz, or more preferably from about 500 kHz to 5 MHz. Such capability has been demonstrated with the FCPA μJewel D-20K, developed at IMRA America, Inc. (Ann Arbor, Mich.). USP optics 102-*a* may be provided with a commercially available unit, or USP optics 102-*a* provided in an end user configuration for the material processing application.

Further discussion of USP sources and applications that can be used with various embodiments of the systems and methods disclosed herein may be found in at least U.S. Pat. No. 7,491,909, ('909), "Pulsed laser processing with controlled thermal and physical alterations", U.S. Pat. No. 7,486,705, ('705), "Femtosecond laser processing system with process parameters, controls and feedback", U.S. Pat. No. 7,626,138, ('138), "Transparent material processing with an ultrashort pulse laser", U.S. Patent Application Pub. No. 2010/0025387, ('5387), "Transparent material processing with an ultrashort pulse laser", and U.S. Pat. No. 8,158,493, ('493), "Laser-based material processing methods and systems", each of which is hereby incorporated by reference herein in its entirety.

The '705 patent teaches, among other things, the use of composite laser pulses for material modification. An output beam might comprise a series of composite pulses (e.g., a pulse comprised of two of more pulses overlapped in time or spaced very closely in time, such as in FIGS. 1A and 1B in '705). The pulses may have a varying repetition rate, wherein the time between the composite pulses is varied. The pulse width values of one pulse may generally be in the nanosecond range, and the pulse width values for a second pulse may generally be in the picosecond to femtosecond range. Pulses may be overlapped to achieve specific materials damage and/or ablation.

U.S. Patent Application Pub. No. 2013/0008880, ('8880), entitled "Pulse laser device, transparent member welding method and transparent member welding apparatus", is hereby incorporated by reference herein in its entirety. The '8880 publication teaches, among other things, the use of a pulse laser system providing repeated low-peak power pulses, for example nanosecond pulses, superimposed on repeated high-peak power ultrashort pulse laser outputs. Various alternative arrangements for generating nanosecond and ultrashort pulse trains are disclosed therein.

Nanosecond pulse source 101-*b* (NS) may include any arrangement capable of generating long pulses having suitable pulse characteristics for modifying transparent material, when used in conjunction with the USP. However, as will be shown below, without pulse 150-a generated by USP, the transparent material 120 may remain essentially unmodified. Pulse 150-b energy may be in the range from about 10 µJ up to about 100 µJ, 200 µJ, or in certain embodiments up to about 1 milliJoule (mJ). A pulse energy may be selected based on fluence (e.g., Joules/cm$^2$) and/or intensity (e.g., W/cm$^2$) appropriate for modification of material 120, when used in combination with USP. Nanosecond pulse 150-b characteristics may include a pulse width in the range from somewhat below 1 ns (e.g.: 750 ps) to about to 10 ns, 1 ns to 10 ns, 1 ns to 20 ns, 1 ns to 50 ns, 1 ns to 100 ns, or similar ranges. In at least one preferred implementation a pulse width in the range from about 5 ns to about 20 ns may be utilized. Intensity may be in the range from about $10^8$ W/cm$^2$ up to about $10^9$ W/cm$^2$, or in certain arrangements up to about $10^{10}$ W/cm$^2$, and the fluence may be determined from the pulse width and intensity.

In a preferred implementation a fiber-based amplification system may be utilized to generate NS pulses with peak power much lower than pulses generated with USP, yet sufficient pulse energy to facilitate cooperative material modification. A pulse repetition rate may be in the range from about 100 kHz to about 5 MHz, or more preferably from about 500 kHz to 5 MHz. In some embodiments NS source 101-b may include a q-switched laser, a directly modulated nanosecond laser diode seed source configured for high-repetition rates, or a gated continuous wave (CW) fiber laser. The pulse temporal shape may be a q-switched, Gaussian-like, triangular, nearly trapezoidal, square, or any suitable temporal profile. One known advantage of a diode-based system is the ability to vary a pulse width, energy, repetition rate, or pulse timing over a relatively wide range. Similar benefits may be achieved with a CW fiber laser. NS optics 102-b may be supplied with the source, or provided in an end user configuration for the material processing application. Further discussion of NS sources may be found in at least several of the background references and in product literature available from numerous laser source suppliers. In various implementations, the USP source 101-a and the NS pulse source 101-b are separate components of the laser processing system, but this is not a requirement.

Referring back to the example of FIG. 1A of the present application, pulse pairs are illustrated, each pulse pair having a single ultrashort pulse 150-a and a single long pulse 150-b, for example a nanosecond pulse. However, in some embodiments the pulses may be grouped to provide more than one ultrashort or nanosecond pulse overlapped with each other, or with a short temporal spacing. Furthermore, in numerous material processing applications the pulses 150-a, 150-b (or other pulse groups) may be repeated in a series of pulses which are delivered to the target material, such pulses may be identical or have varied temporal or spatial characteristics as suitable for a particular application. Accordingly, one or more pulse parameters (e.g., pulse energy, pulse fluence, pulse width, etc.) may be varied from pulse to pulse in a series of USP and/or NS pulses. For example, one or more pulse characteristics of either or both pulses, 150-a, 150-b, in a first pulse pair can, but need not, be different from one or more pulse characteristics of either or both pulses in a second pulse pair. In a preferred implementation the pulse pairs, or other groups, may be generated at a group repetition rate in the range from about 100 kHz to 5 MHz.

In some embodiments, particularly for high-speed micro-machining, if the available pulse energy from USP and NS is sufficiently high, for example about several hundred µJ, or 1 mJ, then the respective outputs of a pulsed laser may be shared among multiple optical systems (not shown). Alternatively, multiple sources and optical systems may be utilized in some embodiments. It is to be understood that such arrangements may be utilized in the practice of certain embodiments.

In the examples and disclosure that follow the wavelength of pulses emitted from USP and NS were generally about 1 µm. However, in some embodiments USP or NS pulses may have wavelengths in the near IR range (e.g.: 700 nm to 2 µm), visible range (e.g.: 400 nm to 700 nm), or near UV range (e.g.: 150 nm to 400 nm). It is to be understood that the term "transparent" is used in its ordinary and general sense. Transparent materials include, but are not limited to, materials that at some wavelength have a low absorption initial condition, before application of a high intensity pulse, as exemplified by transmission or absorption curves and associated absorption edges, e.g.: a transmission range of about 150 nm to 2 µm for glasses, greater than about 1.0 µm or 1.1 µm for silicon, the former value including a wavelength region where silicon is weakly absorbing relative to absorption at shorter near IR and visible wavelengths. For processing of glass, Applicants recognize that laser absorption may be enhanced at short visible or UV wavelengths. Thus, USP and NS sources may include frequency conversion elements (not shown), for example harmonic generator(s), Raman shifter(s), and/or parametric oscillator/amplifier(s) to shift a fundamental laser wavelength to a desired processing wavelength.

Referring back to FIG. 1A, the NS and USP outputs are spatially combined and directed to scanner and beam delivery sub-system 110 which delivers focused pulsed laser beams to the transparent substrate 120 using, for example, a galvanometer-based scanning system (not shown). The focused pulse laser beam(s) may have spot size(s) in the range from about a few microns to up to about 100 µm, e.g.: 25 µm to 75 µm, and the spot size(s) will generally be determined based on the desired fluence, available depth of focus, and desired machining dimensions. Larger spot sizes can limit machining resolution but provide higher throughput. The beams may be focused on or within the material, depending on applications or goals for the machining. If desired or advantageous, substrate 120 may be moved with any suitable combination of motion stages, for example with translation and/or rotary stages (not shown). In various implementations, the substrate 120 may be moved relative to the scanner and beam delivery sub-system 110, the scanner and beam delivery sub-system 110 may be moved relative to the substrate 120, or both the substrate 120 and the scanner and beam delivery sub-system 110 may be moved to deliver the pulsed laser beams to a desired region of the substrate 120. In any of these implementations, the scanner and beam delivery sub-system 110 may include optical elements (e.g., lenses, mirrors, etc.) that alter the direction of the laser beam(s) delivered to the substrate 120. In various embodiments, 110 may include commercially available optics for dispersion compensation of ultrashort pulses, particularly if pulse widths are as short as about 100 fs. In a preferred implementation the beam delivery system is configured in such a way as to allow for automatic spatial adjustment of the pulses, including registration to within a fraction of a focused spot diameter, for example to within 0.1 spot, or 0.25 spot. The focused spot distributions of overlapping pulses 105-a, 105-b may be identical and may coincide. In some embodiments the spot distributions may be different, for example a combination of Gaussian or "top hat" distributions. Likewise, the position of best focus of the pulse laser beams may be displaced laterally (e.g.: x or y direction) or along the optical axis.

The laser processing system includes a controller 130 which may be in communication with various components and sub-systems of the laser processing system. The system may incorporate beam manipulation means (not shown) including elements to monitor one or more pulse characteristic of the laser pulses and to generate feedback data for the controller. The system may be configured such that operation of sub-components therein is individually or cooperatively adjustable with use of the controller. In addition to being configured to control sub-systems the controller may be networked to at least one computing means via a physical link and/or wireless link. The controller is capable of receiving status and diagnostic information from elements of the laser processing system. The '705 patent discloses various control and beam manipulation methods and devices suitable for laser processing systems, which may be readily adapted for use with material processing systems of the present application.

Figure 1B:
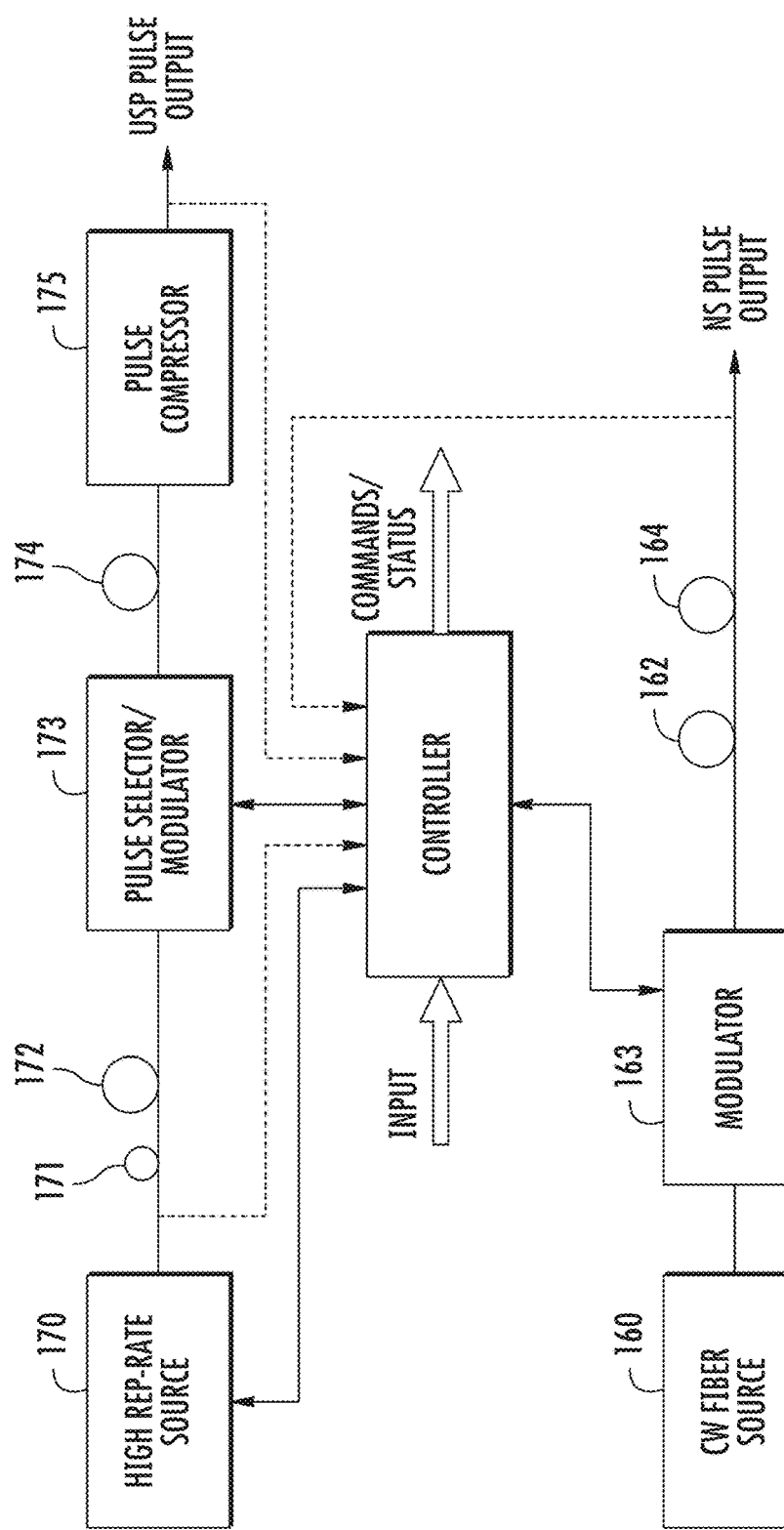
FIG. 1B schematically illustrates an arrangement for generating a series of overlapping pulses according to an embodiment.

FIG. 1B schematically illustrates a USP-NS arrangement, including components used to adjust the temporal overlap between pulses.

In this example NS pulses are generated with a fiber-based system which includes a CW fiber laser 160. The CW fiber laser 160 generates a highly stable, essentially constant output. The CW beam is input to optical modulator 163 which has a rise time sufficiently short to generate nanosecond pulses, for example a pulse 150-b. The optical modulator may be an acousto-optic device or an electro-optic device such as an integrated Mach-Zehnder modulator capable of providing sub-ns rise times. The output of the modulator is effectively a nanosecond laser pulse series resulting from selectively gating the CW input with modulator 163 at a repetition rate. The modulator output is amplified with pre-amplifier(s) 162 and power amplifier(s) 164 to produce nanosecond output pulses. The pulse output from the modulator may be received by NS optics 102-b. The NS optics (and/or the USP optics 102-a) may include lenses, mirrors, prisms, piezo-electric actuators, apertures, polarization components or any other suitable optical components for a material processing application.

Figure 2A:
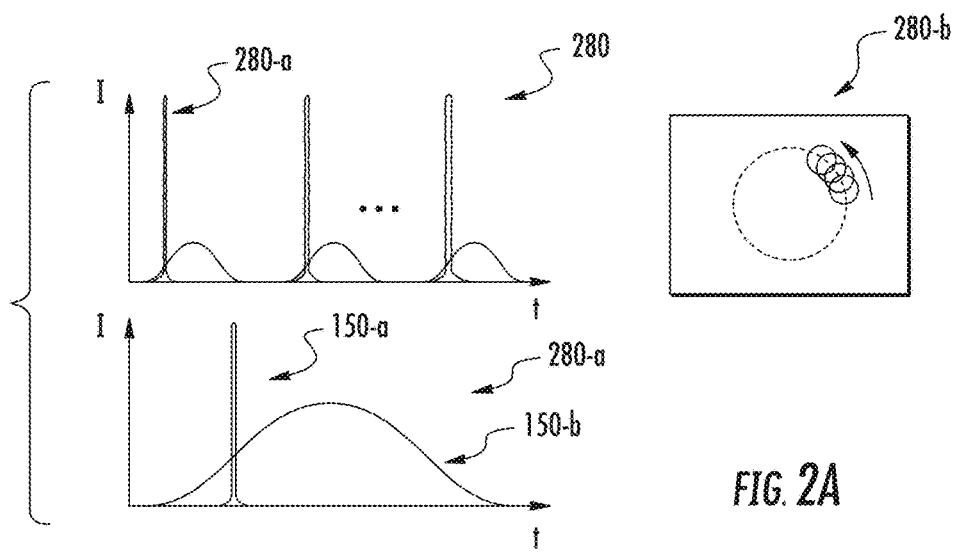
FIGS. 2A-2C schematically illustrate some aspects of a micromachining process according to an embodiment, including basic operation, example machining patterns, and effects of applying USP and NS pulses, individually and as a series of temporally and spatially overlapping pulse series, in the form of pulse pairs (NS-USP).

USP pulses may be generated with a commercially available chirped pulse amplification system, for example as developed by IMRA America, Inc., and further described in '493, e.g.: in at least FIGS. 2A-3 of '493 and the corresponding text. A high repetition rate source 170 may include a high repetition rate (e.g.: 50 MHz to 1 GHz) mode locked fiber laser oscillator. The pulses may be temporally stretched with a length of optical fiber 171, which may include passive optical fiber, or a fiber Bragg grating. In some embodiments bulk gratings may be utilized. The pulse stretcher reduces the peak power prior to downstream power amplification. Subsequent to amplification with pre-amplifier(s) 172 the stretched oscillator output is input to optical modulator 173, which may be identical in design to modulator 163. The modulator of the USP is configured as a down counter (pulse picker) to provide output pulses at a reduced rate relative to the oscillator rate, for example pulses in the range from about 100 kHz to about 10 MHz. The output of the modulator 173 is further amplified by fiber power amplifier(s) 174 and then compressed to an ultrashort pulse width using the compressor 175, which may be a bulk diffraction grating.

Numerous variations can be implemented. In some embodiments direct amplification of the oscillator may be utilized and the pulse stretcher and compressor eliminated, depending on peak power utilized. The NS pulse output may be received by NS optics 102-b. The NS optics may include lenses, mirrors, prisms, piezo-electric actuators, apertures, polarization components, dispersion compensation optics, or any other suitable optical components for ultrashort material processing applications. In various preferred embodiments the power amplifier(s) 164, 174 may be configured with large core, multimode fiber amplifiers configured for single mode operation. The NS and/or USP may contain additional components for example optical isolators, to improve pulse quality, as known in the art. The NS and/or USP systems may also be implemented with polarization preserving fibers and associated components.

The controller 130 includes a synchronizer (not separately shown) to control each modulator 162, 173. The synchronizer provides for adjustment of the temporal offset and/or overlap of the pulses. In at least one embodiment a trigger signal may be derived in response to the mode locked oscillator output pulses which, in turn, can be used can be used to control (gate) modulators 163, 173. The synchronizer is operatively connected to the oscillator 170 to detect the mode locked pulses. The synchronizer includes analog/digital electronic components for example: photodetector(s) and signal processing equipment to detect mode locked pulses, and digital delay lines with ns resolution to provide capability for setting/adjusting temporal overlap of pulses generated in the USP and NS units. For example, with a measurement of the oscillator repetition rate (trigger) the approximate time between pulses is determined (e.g.: 20 ns at 50 MHz repetition rate). Settings for the digital delay line can then be selected in the controller to achieve a pre-determined temporal offset between pulses. In accordance with a preferred implementation the delay may be adjusted such that the ultrashort pulse is delivered to the target at a time corresponding to about the 50% of the NS pulse rise time.

In one preferred implementation the oscillator will generate pulses at a 50 MHz rate and the modulators 163, 173 will produce pulses for material processing at a rate in the range from about 100 kHz to about 10 MHz. If desired, further time-based measurements may be carried out with photodetector(s) and beam manipulator equipment installed in the laser processing system, for example as disclosed in the '705 patent. Such measurements may be used to measure and compensate for other time delays which accumulate in the system. For example, as illustrated in FIG. 1B, portions of the outputs of USP and NS may be detected and corresponding signal(s) utilized with signal processing equipment in the controller to sense and adjust the temporal spacing. The system may also be configured to monitor and characterize the NS-USP pulse characteristics during material processing operation as discussed in '705. Controller 130 may be operatively connected to other various system components which provide capability for synchronizing to other elements of the material processing system, including optical scanners and various beam manipulation devices.

In some embodiments use of the gated CW fiber laser is particularly advantageous. It is to be understood that a mode locked oscillator pulse train is generally free-running. Similarly, although active q-switched nanosecond sources are readily available, a CW fiber laser provides considerable flexibility for interfacing and synchronizing with material processing system components.

Figure 1C:
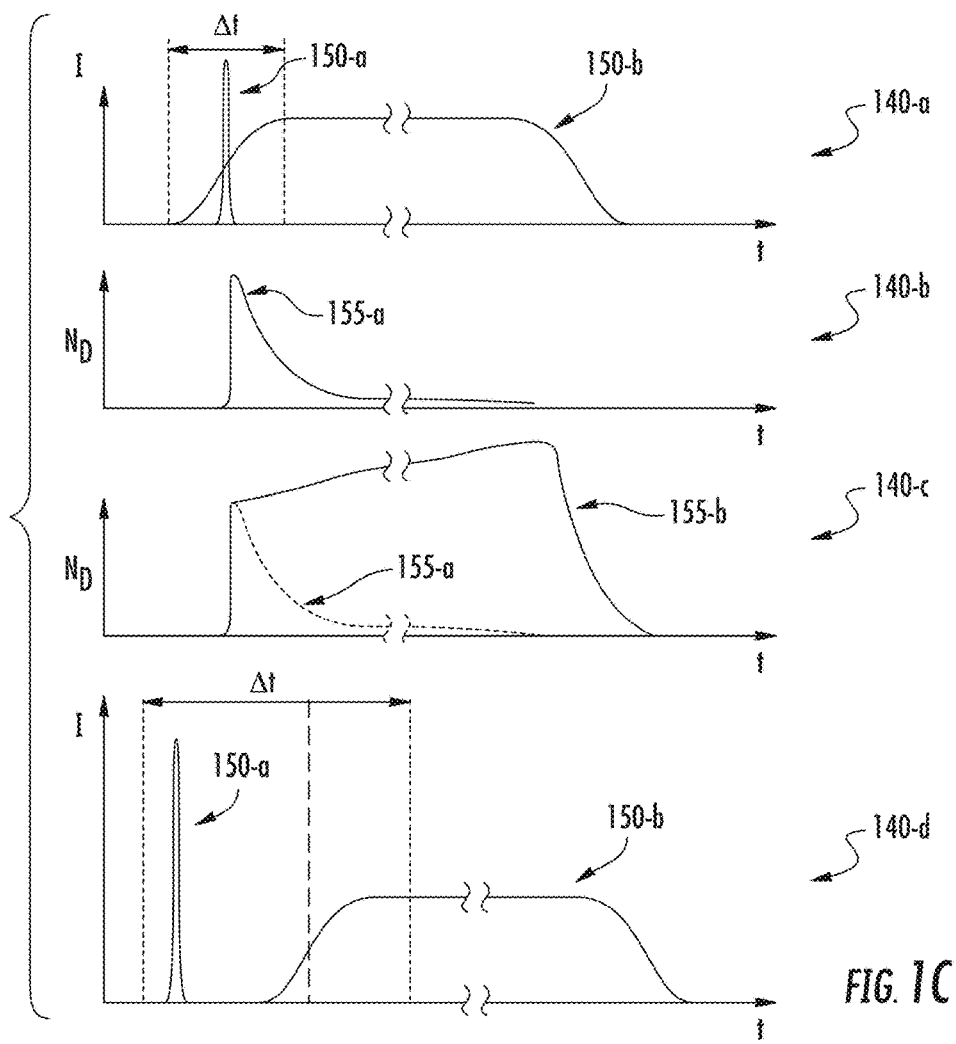
FIG. 1C schematically illustrates cooperative effects of temporally overlapping pulses for material modification, and possible effects on a laser material interaction: A pulse pair is illustrated in which the USP and NS pulses overlap within an example time window, $\Delta t$, which provides an acceptable process window for a desired laser-material interaction (140-$a$); It is believed, although not required, that application of the USP pulse substantially increases the free-electron density ($N_D$) which, in the absence of further laser input, would decay on a ps-ns time scale (140-$b$). Application of the NS pulse further increases and/or maintains the electron density, thereby supporting increased depthwise material modification (140-$c$). An example is shown with time separation increased to a non-overlapping condition with a USP pulse leading a NS pulse, resulting in an acceptable process window (140-$d$).

Referring to FIG. 1C, the time delay between pulses 150-a, 150-b is adjustable in the controller, and preferably adjustable with nanosecond resolution to set the temporal overlap between the pulses. Referring to FIG. 1C, 140-a, an example time delay window, Δt, as shown is characterized by a window centered at a pre-determined point of the pulse 150-b, and in this example is the 50% point of the rising edge of pulse 150-b. The width of Δt can be regarded as an acceptable process window for achieving the desired interaction of 150-a and 150-b with the target material. As discussed above, the USP pulse may overlap the NS pulse at a time corresponding to about 50% of the rise time of NS pulse 150-b. Preferably, the USP pulse 150-a is to be generated such that energy delivered to the substrate occurs well before the termination of NS pulse 150-b, for reasons that will be discussed below. Furthermore, in certain applications, there may be little or no advantage to excessively delay pulse 150-a after the onset of the NS pulse 150-b, as the energy of the NS pulse may not be efficiently utilized in the material interaction. Thus, in at least one preferred embodiment the USP pulse 150-a overlaps between the 10% point and 90% point of the rising edge of NS pulse 150-b, and more preferably between the 10% and 50% points. Although it may be preferred for some applications that the USP pulse 150-a overlaps the NS pulse 150-b on the rising edge of the NS pulse, this is not a requirement, and in other applications, the USP pulse 150-a can overlap with any portion of the NS pulse 150-b (e.g., the rising edge, the falling edge, or in between). For example, the USP pulse may overlap the NS pulse within the initial 25% or within the initial 50% of the NS pulse width.

By way of example, in various material processing operations, a first series having nanosecond pulses will be generated with the ns laser (NS), a second series having ultrashort pulses will be generated with an ultrashort pulse laser (USP), with individual pulses from each laser temporally and spatially overlapped to form collinear pulsed laser beams for delivery to the material to be processed (NS-USP).

FIG. 1C illustrates an example of slightly time-offset pulses 140-d, for example an ultrashort pulse may lead a nanosecond pulse by a few nanoseconds or more, with reference conveniently made to NS pulse 50% point (shown at the vertical long-dashed line). Such slight separation may provide an acceptable process window in certain applications. In at least one embodiment of the pulse pairs, the time window may span a range from about −5 ns, or −3 ns before the NS 50% point (e.g.: the USP leads the NS pulse, time-offset pulses) to about +3 ns, or +5 ns beyond the 50% point (e.g.: the NS pulse leads the USP, overlapping pulses). In some implementations the maximum span of the window Δt may be a function of the NS and/or USP pulse width or energy characteristic, e.g.: fluence or peak power. For example, the USP pulse may lead the NS pulse by up to about 30% of the NS pulse width (as measured between 50% points).

It is to be understood that the time spacing (or time offset) between pulses (which may include a condition of zero or very little spacing or offset) may be conveniently characterized in different ways depending on the temporal pulse shape. For example, the center of a pulse may be defined as a reference, as determined from mid-point between rising edges (e.g.: at 50% point). Similarly, a pulse peak may be utilized as a reference. As discussed above the NS pulse temporal shape may be a q-switched, Gaussian-like, triangular, nearly trapezoidal, square, or any suitable temporal profile.

Without subscribing to any particular theory, underlying operative mechanisms of the laser-material interaction are now considered. It is well established that ultrashort pulses, particularly pulse widths less than about 10 ps, or more preferably less than 1 ps, are particularly useful for processing transparent materials. By way of example, with a single pulse (i.e.: single shot) of 1 ps, intensity of about $2 \times 10^{12}$ W/cm$^2$, and corresponding fluence of 2 J/cm$^2$, multiphoton ionization occurs resulting in rapid generation of free electrons, followed by collisions and generation of additional free electrons. The process can continue up to a point where a critical plasma density is obtained. Subsequent to the termination of the ultrashort pulse material removal occurs as dense plasma exits the surface. It has been further demonstrated that an increase in the intensity, for example to $10^{13}$ W/cm$^2$, together with a reduction in pulse width to 100 fs, the transparent dielectric material exhibits conductor like properties which further enhances the absorption. Upon approaching the critical electron density ($N_D \sim 10^{21}$ cm$^{-3}$ at 1064 nm) laser transmission into the bulk is limited by absorption at the surface or reflection therefrom. Notably, both multiphoton ionization (associated with ultrashort pulses) and impact ionization (associated with longer pulses) increase the electron density, up to the critical density. In any case, with sufficiently high peak power the ultrashort pulse exceeds the damage threshold and material modification occurs via a non-thermal mechanism, over a limited depthwise range. Although not necessary to the practice of embodiments of the present disclosure to understand and fully characterize the underlying mechanisms, the above and additional ultrashort interaction phenomena are discussed in Perry et al (2001), among other references.

Regarding operation with nanosecond pulses alone Applicants found no significant depthwise material modification occurs with pulses having a duration of about 10 ns, and pulse energy up to about several tens of μJ, depending on spot size of the focused pulses on the transparent material. As one example, a 10 ns pulse with 50 μJ of pulse energy focused into a 40 μm spot provided about $0.4 \times 10^9$ W/cm$^2$ and 4 J/cm$^2$ fluence and provided energy characteristics for suitable drilling of tempered glass. Additional examples are provided below. Moreover, when the USP was generated well in advance of the NS pulse any surface roughness generated with the USP pulse 150-a did not substantially increase absorption of the following NS pulse. Overlapping the ultrashort and nanosecond pulses as discussed above facilitated depthwise material removal, resulting in substantially increased processing speed. Notably, the quality of drilled holes was comparable to previous results obtained with femtosecond pulses alone. Further examples of suitable pulse characteristics are provided below.

Without subscribing to any particular theory, Applicants believe proper temporal offset, between pulses 150-a, 150-b enhanced the absorption state initiated by ultrashort pulse free electron formation and plasma generation. It is known that avalanche ionization generally dominates with longer pulses, but can also be initiated with the ultrashort pulses. By way of example, the lifetime of plasma/free electrons generated via the ultrashort pulses may be in the range from about 50 ps to 10 ns, and dependent on ultrashort pulse peak power and target material. For example, example lifetime measurements resulting from application of sub-picosecond pulse widths of about 700 fs ranged from about 50 ps to about 6 ns, and suggested that impurities may cause relatively fast relaxation of the electron density. Some studies have confirmed short lifetime of plasma generated with femtosecond pulses. For example, it was proposed to extend the plasma lifetime with much longer duration nanosecond pulses for ionization of air as reported by Akturk et al. (2012) and Mejean et al. (2006). In such applications, for example, high intensity femtosecond pulses were employed with a goal of triggering and guiding lightning.

FIG. 1C (140-b) schematically illustrates time evolution 155-a of an electron density, $N_D$, generated with application of the USP pulse alone, wherein the electron density decays on a ns time scale in this example. By way of example, the ultrashort pulse may increase the electron density to a significant fraction of the critical density, for example to about 0.1 $N_{critical}$ to 0.5 $N_{critical}$. In accordance with an embodiment of the present disclosure an effect of the NS pulse on the electron density is illustrated. In this example, with application of a NS pulse, which may have substantially more energy that the ultrashort pulse, the electron density 155-b is further increased as shown (140-c), for example asymptotically approaching the critical density, $N_{critical}$. Generally, the NS pulse is to have sufficient energy and pulse width to produce clean, depthwise material modification while avoiding undesirable damage, for example as caused by melting, cracking, or other thermal effects.

Applicants believe even if the lifetime is shorter than the ns pulse duration that nearly all of ns pulse energy could be absorbed in the transparent material because of avalanche absorption. An early portion of a NS pulse, for example the energy within 3 ns or 5 ns after 50% peak intensity, can be absorbed as a result of the temporal absorption state made by the USP pulse. The partial NS pulse causes an enhancement of the free electron density, effectively extending the lifetime. The temporal absorption states can be sustained if the target material is irradiated with sufficient pulse energy. Excessively long delay between NS and USP (although possible in some applications) is not preferred, as it is desirable to exploit the temporal absorption. Generally, the ablation rate is higher with a NS pulse than a USP pulse when the same pulse energy is absorbed by the material because of thermal effects when the fluence is much more than the ablation threshold. Therefore, a NS laser is preferred for high speed machining. However, there is usually a trade-off between the quality and machining rate. A NS laser output can cut faster, but with poor quality compared with a USP laser. For some applications of glass machining, the quality can be very critical because even a small crack can grow from any external stress and eventually break the entire substrate resulting in a substantially lower value-added and weaker product. However, a goal of some embodiments is to obtain both high speed and high quality. Examples are discussed below.

Figure 2B:
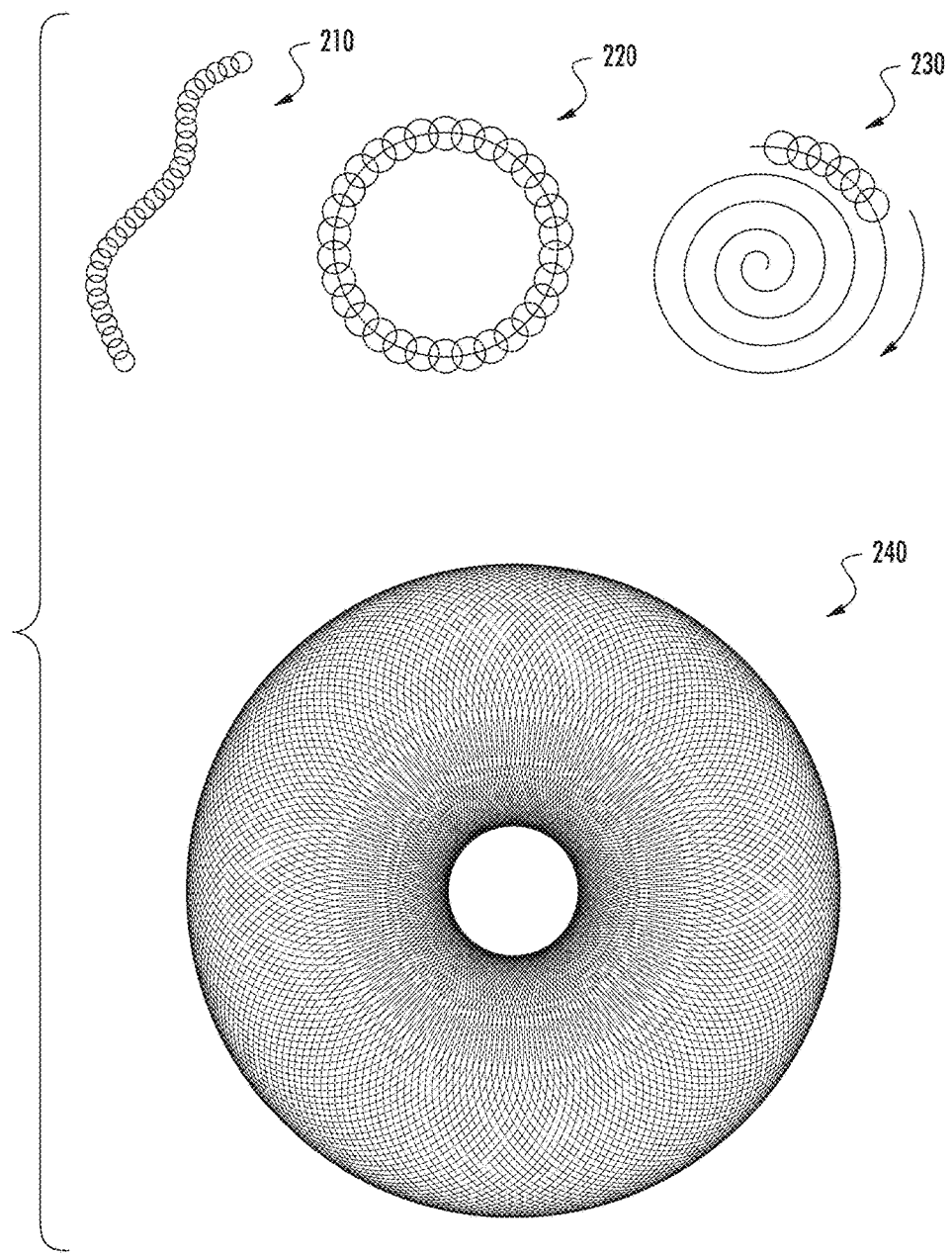
Figure 2C:
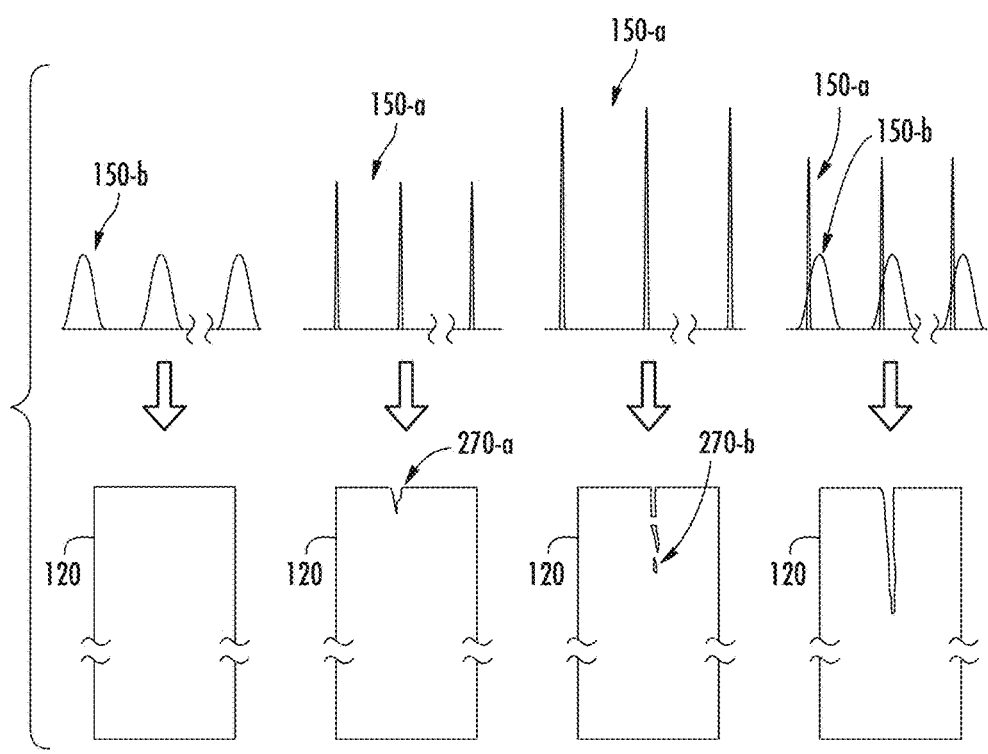

FIGS. 2A-2C schematically illustrate some aspects of a micromachining process according to an embodiment, including basic operation, example machining patterns, and effects of applying USP and NS pulses, individually and in combination.

FIG. 2A illustrates an example in which a hole is to be drilled with a hole diameter much larger than a focused spot size. For drilling relatively large holes (e.g.: 1 mm) in transparent materials extremely high pulse energy and fluence generally would be needed if the hole is on the order of a spot diameter. Initially, for the purpose of illustration, it is assumed that the focused pulse laser beams from the USP and NS sources are perfectly aligned in three-dimensions, identical in size, and with identical spatial distributions. Thus, in this example each spot area in region 280-b corresponds to a pulse pair 280-a, and a series of such consecutive pulse pairs 280 are sequentially delivered and focused at the substrate surface, or internal to the surface. Thus, a series of spatially and temporally overlapping pulse pairs are applied to the target substrate, each pulse pair having a USP and NS pulse. In the illustration the pulse pairs have identical spatial and temporal characteristics, but such a restriction is not necessary in practice of various embodiments, and a first pulse in a pulse pair can have a different spatial and/or temporal characteristic than a second pulse in the pulse pair. In this example the initial portion 280 of the micromachining is carried out by irradiating the circumference of a circular hole to be drilled.

Depending upon the specifications for processing a given transparent material, the processing steps may be programmed to carry out one or more methods for laser drilling, including but not limited to: (a) percussion drilling in which a succession of focused pulses may create a thru-hole approximately the same size as the focused beam, (b) trepanning (including concentric circles and spiral patterns) to remove a cylindrical shaped region. In some embodiments a wobble path (combination of circular trepanning and linear or circular translation) may be utilized to refine the shape of a hole. In various embodiments scanner and beam delivery system 110 may include any suitable combination of beam movement mechanisms including linear or resonant galvanometer-based deflector(s), acousto-optic deflector(s), beam translator(s), rotating prism(s), wobble plate(s), or the like. Translation and/or rotation mechanisms may also be used to induce motion of target material 120 (e.g.: a transparent substrate). Such mechanisms have been widely used in laser drilling and micromachining applications. Drilling commands may be provided via controller 130 which can be configured to include commercially available (turnkey) scan controllers.

FIG. 2B illustrates example scan patterns which may be utilized for laser drilling and other material processing operations. It is to be understood that the focal position of the pulsed laser beams and/or position of the substrate may be adjusted depthwise to remove material at different depths. The depthwise drilling is sometimes referred to a helical drilling, for example as illustrated in Dhar et al., where the trepanning is essentially carried out in the depthwise direction. Referring to FIG. 2B, the material may be processed, at least in part, by repeatedly delivering overlapping spots along the circumference of a circular hole 220. After a sufficient volume of material is removed in the depthwise direction and along the circumference a thru-hole is formed. In some embodiments a hole, kerf, scribe or other feature may be formed, at least in part, with a curvilinear pattern 210. When processing certain glasses, for example sapphire, a scan pattern 220 may be generally directed along the circumference of a circle and in the depthwise direction and terminated when a completed thru-hole is formed. In certain embodiments a spiral scan pattern 230 may be utilized to remove material near the hole edge and in the central portion, or to increase the kerf width for deeper penetration into thicker substrates. Scan pattern 230 is illustrated as progressing from the outer portion of the hole to the inner portion, but the opposite trajectory may also be utilized. In some embodiments combinations of different scan patterns may be utilized.

In some embodiments a "wobble function" (not shown), for example as available from SCANLAB AG (Germany), may be advantageously applied to controllably vary the width of the scan line and the kerf formed at the substrate. For example, the line/kerf width in the patterns 210, 220, 230 can be broadened. Beam delivery system 110 may include commercially available scanning equipment as available, for example, from SCANLAB AG. The available product features include, among other things a wobble function. By way of example, a scanner providing a wobble function may operate with a wobble frequency of about 500 Hz, in the range from about 100 Hz up to about 1 kHz, and generally not so fast that the scanner frequency response will degrade hole quality. More particularly, because a narrow kerf can act as an aperture which blocks a portion the incident laser beam from reaching deep into a cut, widening the kerf can be advantageous to form deeper cuts, up to a point where it is more efficient to flip the substrate and employ double-sided machining. In some embodiments such double-side machining may be employed while maintaining hole registration, and with the use of a single laser drilling system. An effect of the wobble function was further analyzed in view of the effect on material removal for various machining operations. Referring back to FIG. 2A pattern 240 is representative of the path of scan lines when a wobble function is added to X-Y scanning to form a circle. The scan lines illustrate the laser energy deposition density. In this example, there is a higher density of lines near the outer diameter and inner diameter, meaning more laser energy is applied at the outer and inner diameters. Thus, when cutting a straight line portion, the two edges will receive more laser light than the center, which is desirable for a thru-cut. However, if forming a trench, this scan pattern may not provide an advantageous distribute of laser light to produce the desired trench cross-section.

Generally, in many applications it is desired to provide rapid throughput for laser drilling. In an example implementation for processing sapphire, which is particularly challenging, a series of USP and NS pulse pairs may be applied with a linear scan speed in the range from about 0.5 m/sec to 1 m/sec, and a typical speed of about 0.75 m/sec. The spot diameter on the surface may be in the range from about 25 µm to about 100 µm, which provides for precision machining yet an acceptable depth of focus. By way of example, in an implementation where the focused spot sizes of the NS and USP pulses are approximately the same, overlap between spots may exceed about 90%, and may be in the range from about 95% to greater than 99%. Processing of fused silica or other glasses may be carried out at somewhat larger speeds, for example greater than 3 m/sec, and up to 10 m/sec, up to a point where scan repeatability and reliability becomes a limit.

FIG. 2C schematically illustrates example results obtainable with various parameters. As shown in the left panel of FIG. 2C, application of NS pulse 150-b in a series as shown, without USP pulse(s) 150-a, does not result in desirable material modification. If NS pulse energy is too high and/or the pulse width too long undesirable cracking, melting, or thermal effects may occur.

As shown in the second-from-left panel of FIG. 2C, application of a USP pulse series, as shown, with each pulse 150-a can result in material modification in the form of a surface groove 270-a if the USP pulses are focused at or near the surface. By way of example, pulses having widths in the range from about 500 fs to 10 ps, a pulse energy from about 1 µJ to 10 µJ, focused into a diameter of 25 µm to 100 µm may be utilized to form a surface groove in fused silica, sapphire, or other materials.

As shown in the third-from left panel of FIG. 2C, application of a USP pulse series, as shown, with each pulse 150-a at increased intensity (as compared to the example depicted in the second-from-left panel), can produce increased internal depthwise material modification 270-b with pulse parameters as above. In this example one or both of the NS and USP pulse laser beams may be focused within the substrate. In some arrangements in which the peak power is well above a self-focusing threshold filamentation tracks may result, as will be further discussed below.

The '138 patent teaches among other things, the use of ultrashort pulse lasers for forming surface grooves and internal material modification of transparent materials.

As a further consideration high peak power levels, and with certain optical system configuration, self-focusing effects may be initiated which may further enhance capability for high speed operation. Factors for self-focusing within a substrate include peak power exceeding a single- or multiple-shot threshold, and may further depend on the optical system configuration (e.g.: useful numerical aperture (NA)) and various material properties. Recent progress has been reported as disclosed, for example, in U.S. Pat. No. 7,303,977, PCT Pub. No. WO2012/006736, U.S. Patent Application Pub. No. 2005/0000952, Shah et al. (2004), and Ahmed et al. (2007). In various embodiments such effects may be exploited with USP to further facilitate depthwise material modification, provided that reproducibility and throughput are sufficient for application goals.

Referring back to the right panel of FIG. 2C, application of a series of pulse pairs having USP 150-a and NS 150-b in the manner described herein results in material removal over an increased depthwise range, thereby improving processing speed relative to that of the USP taken alone.

Applicants discovered that with the combination of USP and NS the depth of removal of material was much greater than with the use of USP only. Surprisingly, however, the processing results (edge quality) were nearly as good as with USP processing alone. A particularly large aspect ratio (feature depth/feature width) was found with fewer passes. This may suggest the combination of USP and NS may be particularly advantageous for fast, high quality drilling of transparent substrates, for example substrates having a thickness in the range from about 50 µm to 250 µm. As discussed above, application of NS alone did not result in useful material modification.

Applicants further determined that pre-processing a substrate with a series of ultrashort pulses 150-a, and without NS pulses, can avoid chipping at the edge of the fabricated holes. Without being bound by any particular theory, the superior results may follow from the capability of USP to remove a relatively small portion of the material at or near the substrate surface while maintaining a low heat affected zone. It is also possible that this pre-processing by USP roughens the surface and assists with the subsequent NS-USP process, perhaps reducing the threshold. Surface roughening by fs pulses only is expected to produce less thermal damage compared to the hybrid process (using both USP and NS pulses), thus the improved edge quality. The level of material modification during pre-processing is similar to that schematically illustrated with surface groove 270-a of FIG. 2C, and a scan pattern for a single hole similar to that illustrated for region 280-b in FIG. 2A.

Considerable interest exists for fabrication of small holes arranged with relatively fine pitch, for example a 1 mm hole diameter and 1.5 mm pitch. By way of example, a fine pitch hole diameter may be a fraction of 1 mm (e.g.: at least about 100 µm) and the pitch may be about 1.5-times to 5-times a hole diameter.

Figure 3A:
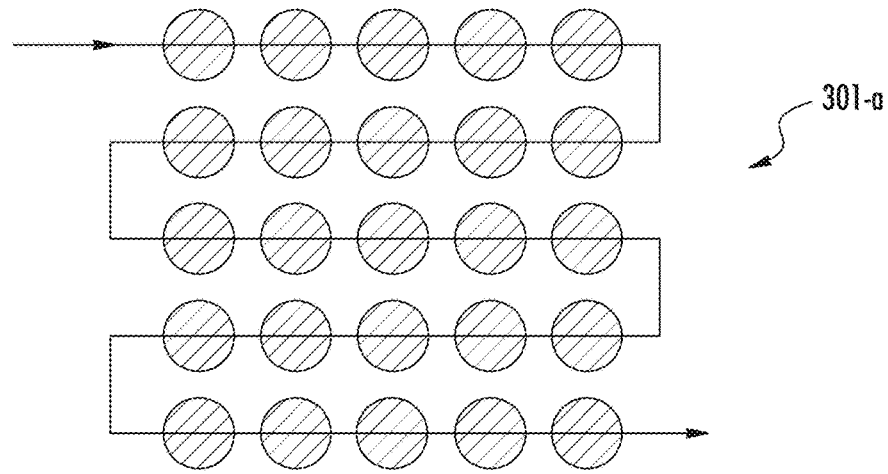
FIG. 3A schematically illustrates a conventional laser processing path for sequentially drilling holes in a material.

By way of example, FIG. 3A schematically illustrates a 5×5 array of holes and a conventional serpentine or raster scan pattern 301-a for sequential processing to form the holes. In this example a possible trepanning process for each hole is not shown. Notwithstanding the suitability of known drilling methods in the practice of certain embodiments of the present disclosure, Applicants discovered drilling results may be degraded by heat accumulation effects for closely spaced holes, or for arrays of fine pitch holes. Although ultrashort drilling is commonly regarded as an athermal process, such conditions do not necessarily apply with a combination of USP and NS, as evidenced by experimental results.

Figure 3B:
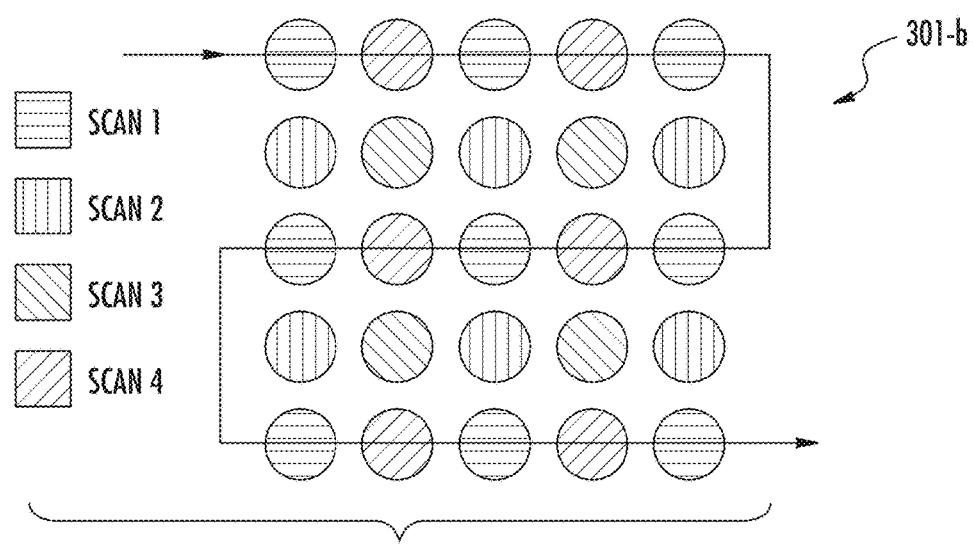
FIG. 3B schematically illustrates a laser processing path according to an embodiment, the processing path avoiding undesirable heat accumulation effects for drilling multiple closely spaced holes in a material.

Applicants discovered that heat accumulation effect can be substantially eliminated by utilizing a drilling (or more generally processing) path in which at least some consecutively drilled holes are separated by more than a nearest neighbor distance to limit heat accumulation effects and/or allow more time for residual heat in the target material to dissipate. In some embodiments a single pass in which locations are drilled in alternate rows and columns may be sufficient. By way of example, FIG. 3B (with a legend in which cross-hatching shows the pass number) illustrates a multipass process for hole drilling locations on a rectangular grid. Referring to FIG. 3B and the legend, holes are to be drilled in alternating rows and columns (see example processing path 301-b) in this example. A similar pre-determined pattern was used by Applicants to drill holes in a sapphire substrate in a 7×7 array, with avoidance of undesirable heat induced damage. The diameter of each hole was about 1 mm with pitch of the array about 1.5 mm. On the other hand, when utilizing conventional sequential drilling, large cracks were formed. Advantageously, if the hole drilling time is significantly longer than the time to move between holes, there should not be a detrimental increase in process time with non-sequential drilling. The series of holes drilled during the final pass may be the most challenging to drill, because there is the least amount of material surrounding the hole that can absorb the excess heat. Thus, the laser processing technique disclosed herein provides a benefit of being able to drill such small, closely spaced holes. Further, the USP and NS pulses may provide high quality holes with a speed improvement relative to USP alone.

Machining paths where a specific depth to each hole is achieved with each pass (not a thru-hole) are also possible for reducing or minimizing the effects of heat accumulation when drilling an array of small, closely space holes. The array of thru-holes is achieved after the completion of multiple passes of the machining path.

It can be appreciated that other fine-scale micromachining operations, for example cutting, scribing, trench digging or the like, can benefit from path planning for reduction in heat accumulation. The path may be pre-determined based upon a model or measurements of heat accumulation and controller 130 programmed to generate a scan sequence, which in turn may be improved or optimized subject to overall system constraints. Moreover, in order to increase or recover processing speed in drilling or other applications multiple beams may be generated and simultaneously scanned with scanner and beam delivery system 110 using well established techniques. In various embodiments active cooling of the target may be implemented with a gas nozzle (not shown) or other gas delivery options utilized for high power material processing.

Figure 4:
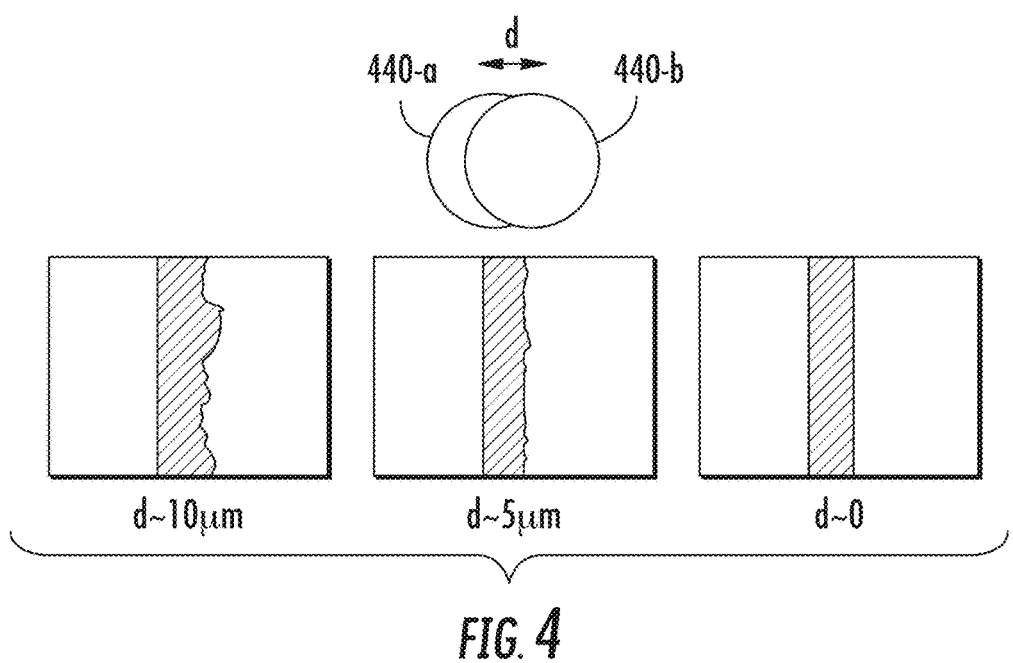
FIG. 4 schematically illustrates an example in which machining quality is degraded by a lateral spatial offset (center-center, perpendicular to the motion direction) between focused pulsed laser beams generated with USP and NS sources.

Processing with multiple laser beams can be effected by spatial alignment. Thus, the spatial characteristics, including the relative spot sizes and positioning of the focused pulsed laser beams corresponding to pulses 105-a, 150-b, are to be considered. Preferably, the USP and NS pulse laser beams will be delivered along collinear optical paths. FIG. 4 schematically illustrates an effect of decreasing the lateral (center-center, perpendicular to the motion direction) registration between focused USP spot 440-a and focused NS spot 440-b. Applicant's results showed kerf quality is greatly decreased with increasing lateral offset, d, resulting in edge chipping on one side (see d~10 µm and d~5 µm examples in FIG. 4), whereas smooth edges were observed with close registration (see d~0 example). In various embodiments spatial registration (offset) between the beams will preferably be about 0.25 of a spot diameter or finer, and more preferably about 0.1 to 0.025 spot diameter, assuming nearly identical focused spot sizes. If the spot sizes are not identical the offset may be specified relative to the smaller spot diameter.

In some embodiments, for example where precision is desired along a single edge, the registration tolerance may be relaxed, for example by about 0.5 to 2 spot diameters ($1/e^2$), while achieving good edge quality. Similarly, in certain embodiments some spatial offset of the beams can be advantageous. For example, a spot offset along a direction of beam translation can potentially facilitate the rate of removal. Another possibility is to allow some spatial offset along the axial direction (z-axis).

In some embodiments the NS spot may be smaller than the USP spot. Although in certain embodiments lateral (center-center) spot alignment may be critical, the USP and NS spot sizes may be different. By way of example, the NS spot may be somewhat smaller than the USP spot, for example the NS spot may be about 50% to 90% of the USP spot size, and may increase the available fluence of the NS beam accordingly.

Because the results ultimately are related, at least partly, to NS energy (fluence) and USP plume/plasma size of the material modification area varies, and is not always a strong function of the laser spot size, e.g.: the $1/e^2$ diameter. The material modification spot will vary with the material ablation threshold. Thus, the size of the material modification spot is to be considered for determining the plume and plasma characteristics generated by the USP pulse. A preferred NS spot size may, in turn, depend on the NS energy (fluence) and NS plume/plasma dimension. Thus, in some embodiments, a displacement may be defined relative to the extent of material modification, for example 50% or more of the lateral dimension of a modified region. Such a criterion may be particularly pertinent for relating to the plasma or plume characteristics of the USP or NS pulses.

In certain preferred embodiments adjustable optics may be included in optical systems 102-a, 102-b or beam delivery system 110 to align the focused beams in up to three-dimensions or adjust the spot size. In some embodiments the beams may dynamically adjusted or manipulated via controller 130. Such methods are well established and exemplified in '705 and other references.

EXAMPLES AND MEASUREMENTS

Lifetime Measurements

As discussed above, example plasma lifetime measurements resulting from sub-picosecond pulse widths of about 700 fs ranged from about 50 ps to about 6 ns, and suggested that impurities may cause relatively fast relaxation of the electron density. The following results were measured with samples irradiated with approximately 700 fs pulses having pulse energy of about 0.5 µJ, at a wavelength of about 1.05 µm. Measurements were obtained with a 10× objective lens. The spot diameter at focus was about 5 µm, and much smaller than the 40 µm spot used for glass cutting in the following examples. However, the fluence was approximately the same with both arrangements. Results were as follows:

| MATERIAL | LIFETIME (50% POINT) |
| --- | --- |
| Soda lime glass | 50 ps |
| Non-alkali glass | ~500 ps |
| Quartz | 6 ns |
| SiC (standard grade) | 100 ps |
| SiC (Research grade) | 5 ns |

It is known that impurities and occlusions in glass can significantly increase light absorption and scattering. The present results suggest concentration of impurities may greatly decrease the plasma lifetime. Sapphire measurements were not performed, but the plasma lifetime may be similar to quartz or research-grade SiC. Notably quartz and research-grade SiC samples provided similar results.

NS Pulses—Characteristics and Example Range of NS-USP Operation

Nanosecond pulses having a 10 ns pulse width (FWHM) were focused into spot sizes ($1/e^2$) of about 40 µm at the sample surface. The pulse energy characteristics included Energy (E), Fluence (F), Peak power (P), and Intensity (I). The pulse repetition rate was about 1 MHz. Results obtained with NS-USP processing were as follows:

| E (µJ) | F (J/cm$^2$) | P (kW) | I (W/cm$^2$) | Observation |
| --- | --- | --- | --- | --- |
| 20 | 1.6 | 2 | $1.6 \times 10^8$ | Near threshold |
| 80 | 6.3 | 8 | $6.3 \times 10^8$ | Excitation, NS-USP material modification |

These example values show an operating range of at least about 4-times, from threshold to undesirable damage. The desired characteristics may vary with the transparent material, but F may be in a preferred range from about 1.5-6 J/cm$^2$ and corresponding intensity as determined from the pulse width.

In some embodiments, and with the NS laser of the NS-USP combination, F may be in the range from about 1-10 J/cm$^2$ to achieve sustained excitation, but also sufficiently low to avoid undesirable damage. In some embodiments sustained excitation may occur at a NS pulse fluence of more than about 1 J/cm$^2$. The maximum fluence of a NS pulse may be up to about 10 J/cm$^2$, 15 J/cm$^2$, or 20 J/cm$^2$, depending on the material to be processed.

Example USP pulse characteristics included ~0.7 ps pulse width, about 20 µJ pulse energy, repetition rate of about 1 MHz. and fluence of about 1.6 J/cm$^2$. In some embodiments, for example, pulse width may be from about 100 fs to 10 ps, with fluence in the range from about 0.25, or 0.5 J/cm$^2$ up to about 5 J/cm$^2$, or 10 J/cm$^2$.

Figure 5A:
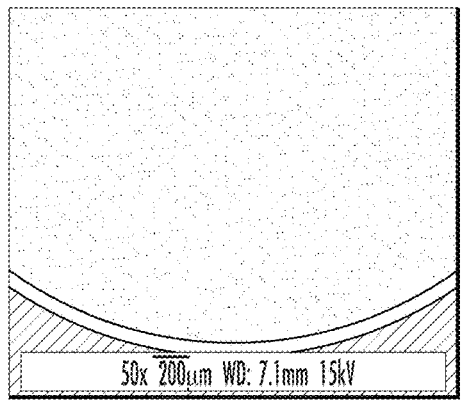
FIGS. 5A-5C illustrate glass cutting results obtained with femtosecond (fs), picosecond (ps), and combined USP and NS ("hybrid" or NS-USP) processing, respectively. The results provide a comparison of edge quality.
Figure 5B:
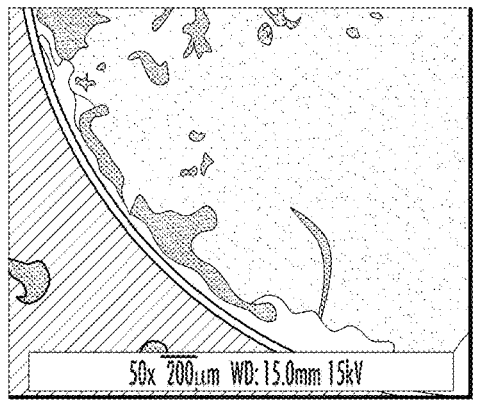
Figure 5C:
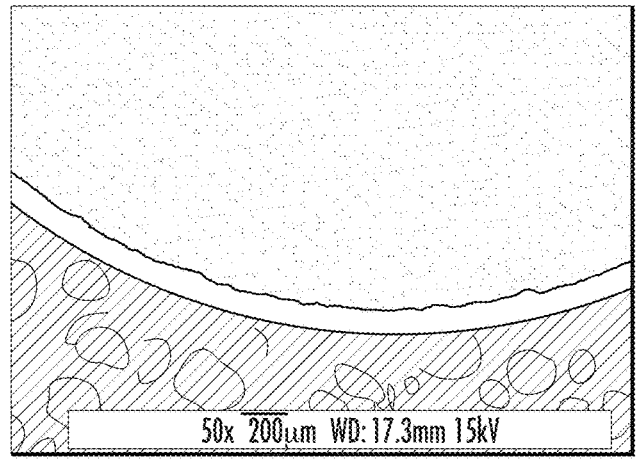

Processing Example: NS-USP Compared to Femtosecond, Picosecond, and Nanosecond Processing FIGS. 5A-5C demonstrate glass cutting results obtained with femtosecond (fs), picosecond (ps), and combined USP and NS ("hybrid") processing, respectively. The result with the femtosecond laser shows best edge quality (FIG. 5A). The hybrid result is slightly degraded but shows similar results (FIG. 5C). It is interesting that the cut-edge quality is very good even with the addition of the NS laser of the hybrid system, which was advantageous regarding faster processing speed and not expected. It also was observed the fs laser has some contribution other than making absorption state for ns pulse. The edge quality is significantly improved relative to the ps results.

Notably, when FIG. 5C is compared with published data obtained from commercially available UV nanosecond lasers it is apparent the edge quality is much better, for example edge variation is reduced by a factor of about 5-times, as estimated by visual examination of some scanning electron microscope (SEM) images. Further relative improvement in edge quality may be achieved with system refinements and optimization, for at least about 10-times and up to about 20-times. Furthermore, in some NS-USP embodiments an ultraviolet (UV) ns laser may be utilized as the NS source, which may result in improved efficiency. Some nanosecond UV processing results are shown, for example, by Bovatsek et al, "DPSS Lasers Overcome Glass Process Challenges", Photonics Spectra, September 2012, Pages 50-54. Furthermore, with the ps laser, only low repetition rate and low power could be used to cut tempered glass. The tempered glass spontaneously fractured when using 1 MHz ps pulses with higher power, perhaps due to microcracks generated by the longer laser pulse which propagated due to heat accumulation from the combination of the longer pulse and high repetition rate.

Multiholes (Overlapping) Made in Tempered Glass

Figure 6:
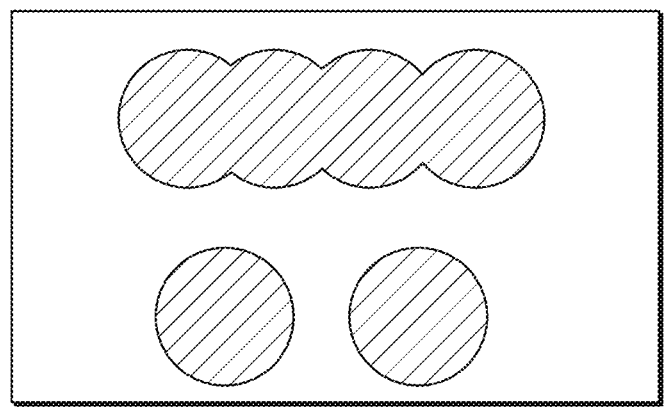
FIG. 6 schematically illustrates fine pitch holes drilled in a transparent material with pulsed laser beams derived from the NS and USP sources. The results demonstrated ability to form overlapping and fine pitch holes without significant undesirable damage.

FIG. 6 schematically illustrates a tempered glass substrate with multiple overlapping thru-holes. These results suggest the residual and/or induced stress associated with NS-USP system may be relatively low compared with other high repetition rate lasers (fs, ps). Such holes were formed with the NS-USP system. Attempts to make such multiple overlapping thru-holes (multi-holes with overlapping portions) with fs and ps lasers resulted in glass breakage when making the second hole which overlapped with the first.

Applicants also found that a 75 µJ ns pulse focused with f=100 mm lens into a spot size of about 40 µm does not have enough energy to ablate glass. In fact, no material modification was observed when using only the ns laser. Moreover, even after the surface is ablated by the USP laser, a potentially roughened surface does not absorb substantial energy from the ns laser.

Figure 7A:
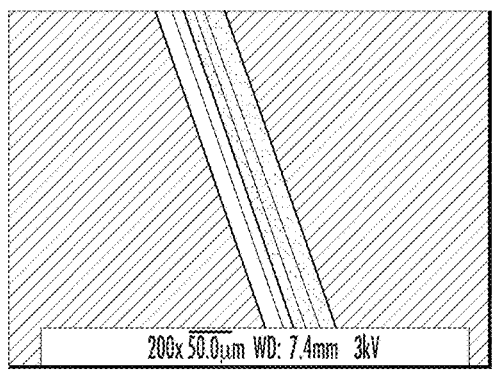
FIGS. 7A-7D illustrate a comparison of cuts in tempered glass (thickness 0.7 mm) at different magnifications with USP alone (FIGS. 7A and 7C) and with an embodiment of the hybrid NS-USP system (FIGS. 7B and 7D).
Figure 7B:
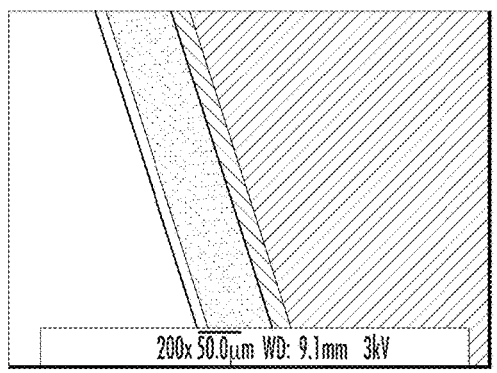
Figure 7C:
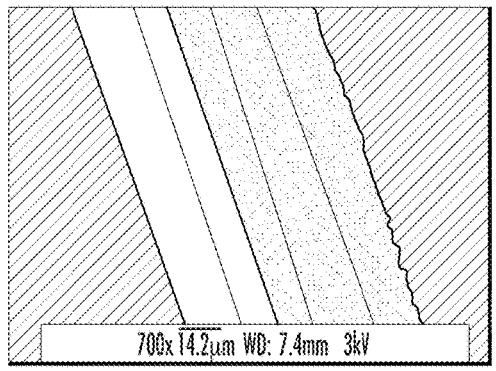
Figure 7D:
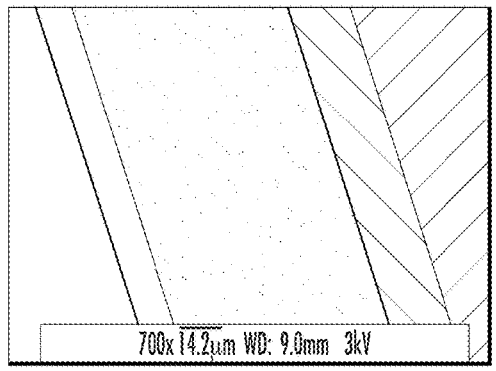

FIGS. 7A-7D are SEM images respectively illustrating comparison of cuts in tempered glass (thickness 0.7 mm) at different magnifications with USP alone (FIGS. 7A and 7C) and with the hybrid NS-USP (FIGS. 7B and 7D). The result suggests the sidewall of the groove made with the hybrid method is somewhat smoother than obtained with USP alone. In this example a repetition rate of 1 MHz was utilized.

Processing Example: Sapphire

A relatively thick sapphire substrate, having thickness of about 0.6 mm, was processed and analyzed. A first processing step (Pre-processing as discussed above) was carried out using 1 MHz USP pulses (700 fs) at a repetition rate of about 1 MHz. This initial Pre-processing was used to form a surface scribe, for example as illustrated in FIG. 2C. The USP average power was about 12 W, corresponding to pulse energy of about 12 µJ. The second processing step employed USP pulses with the same pulses characteristics and repetition rate as Pre-processing, but with the NS-USP configuration, and with NS power up to about 80 W, where catastrophic cracking occurred. At 65 W a thru-hole was not formed in the relatively thick substrate. However, an average NS power of about 71 W, combined with the USP pulses, produced a clean hole in the substrate with essentially no cracks.

Figure 8:
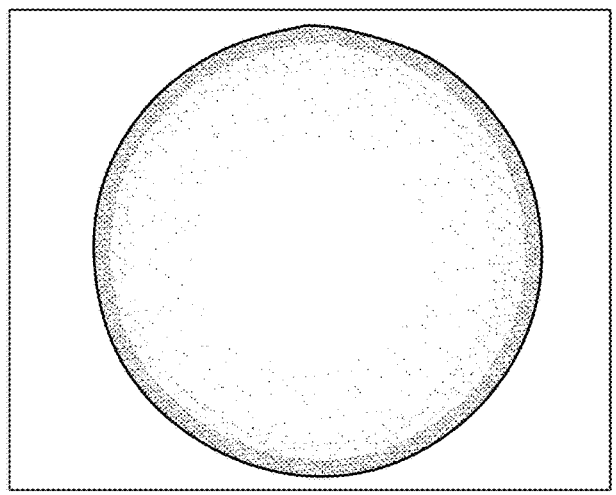
FIG. 8 illustrates a hole drilled in a sapphire substrate with NS-USP pulsed laser processing.

The processing results demonstrated capability for clean, high-speed drilling of relatively thick sapphire substrates, one of the more difficult transparent materials to process. FIG. 8 illustrates a processing result which exhibits good edge and hole quality over the drilling depth. The hole diameter is approximately 1 mm, and the substrate thickness was 0.6 mm. In certain applications the substrate thickness may be up to about 0.7 mm (700 µm), or may be in the range from about 100 µm to 250 µm, which may facilitate processing and throughput with a NS-USP arrangement.

Processing Example: Non-Alkali Glass

Figure 9A:
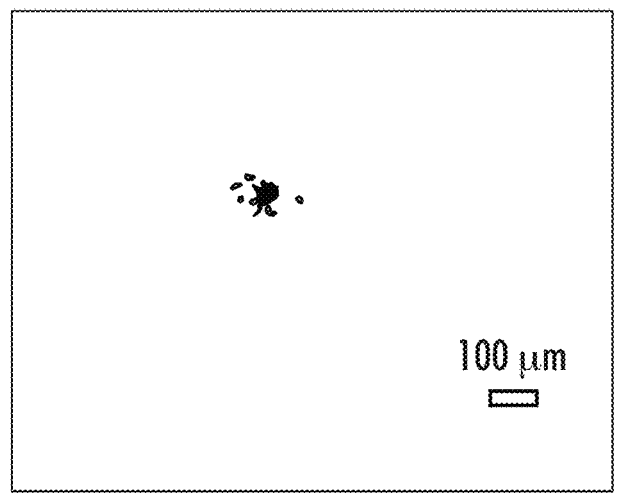
FIGS. 9A-9B illustrate an example of non-alkali glass drilling with the NS-USP system.
Figure 9B:
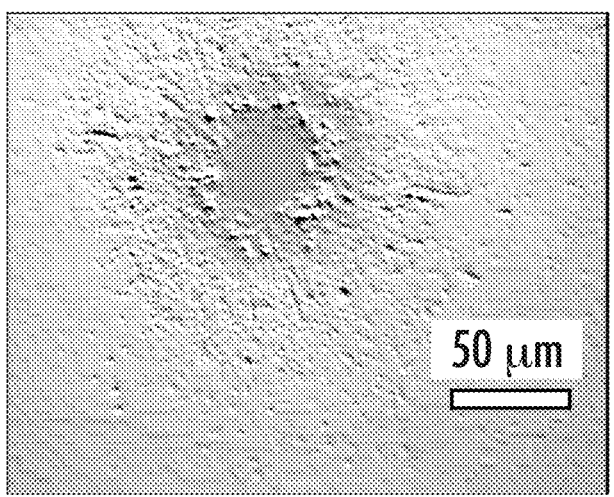

Non-alkali glass drilling was demonstrated with the hybrid system. FIG. 9A shows a drilled hole with an enlarged view illustrated in FIG. 9B. No pre-processing step was utilized in this example. The USP average power was about 9.5 W with about 32 W of NS average power. When NS was increased to more than 40 W catastrophic cracking occurred.

NS-USP Registration and Cut Quality

Figure 10:
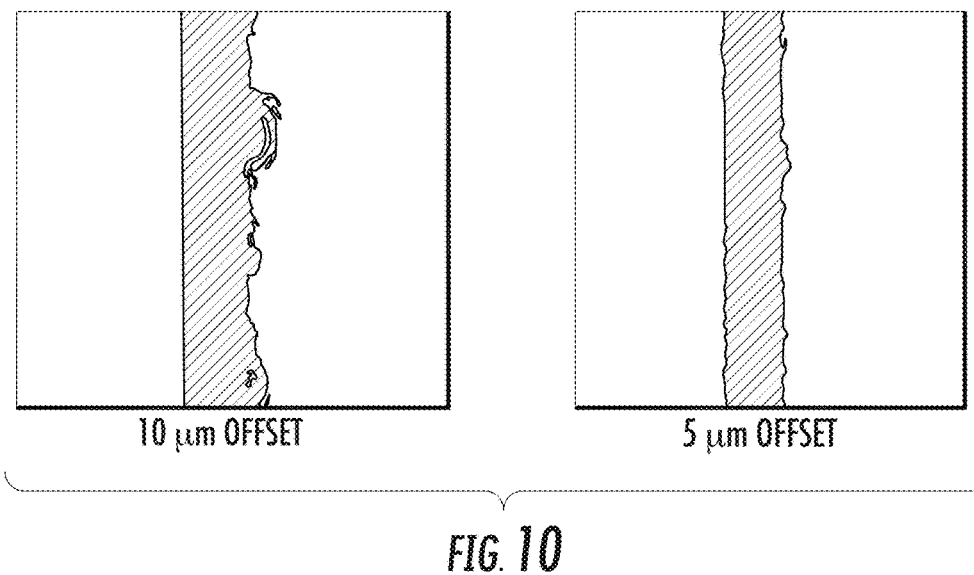
FIG. 10 illustrates an example in which machining quality was degraded by a spatial offset (in the lateral direction, perpendicular to the direction of motion) between focused pulsed laser beams generated with USP and NS sources (similar to the example of FIG. 4).

An effect of beam misalignment (e.g., mis-registration) was discussed above and schematically illustrated in FIG. 4. The schematic illustrations in FIG. 4 are based on experimental results for offsets (d) of 5 µm and 10 µm shown in FIG. 10. The results show precise spatial overlapping between USP and NS pulses can be advantageous for better quality cutting. The results show a large difference of cutting quality when the USP and NS overlapping accuracy was changed.

Additional Glass Cutting Examples with NS-USP (Corning® Gorilla® Glass)

NS-USP processing was used to cut circular holes in a Corning® Gorilla® glass sample. The samples were 100 mm square with thickness of about 0.7 mm. Gorilla® glass is an example of a damage-resistant glass used for touch-screen displays and can be a glass with a chemically-strengthened, compression surface layer. The surface layer of the glass can be strengthened by an ion-exchange process. The glass can comprise an aluminosilicate or alkali-alumi-nosilicate material.

Figure 11A:
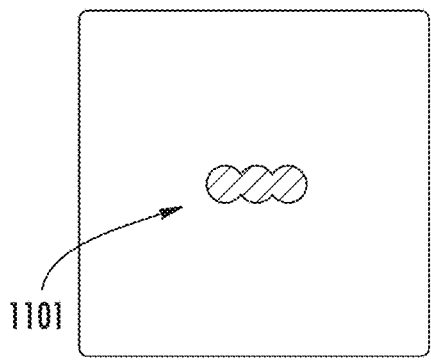
FIGS. 11A-11F schematically illustrate display glass cutting examples (FIG. 11A-11C) and images showing corresponding holes cut in a display glass (FIGS. 11D-11F)
Figure 11B:
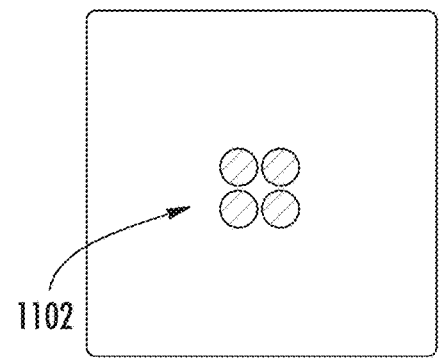
Figure 11C:
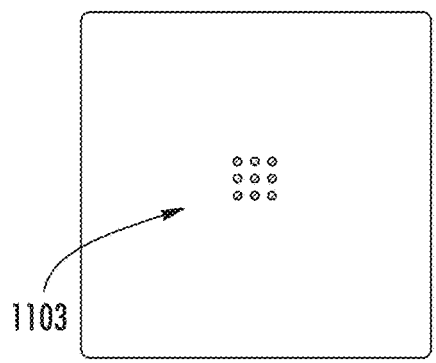
Figure 11D:
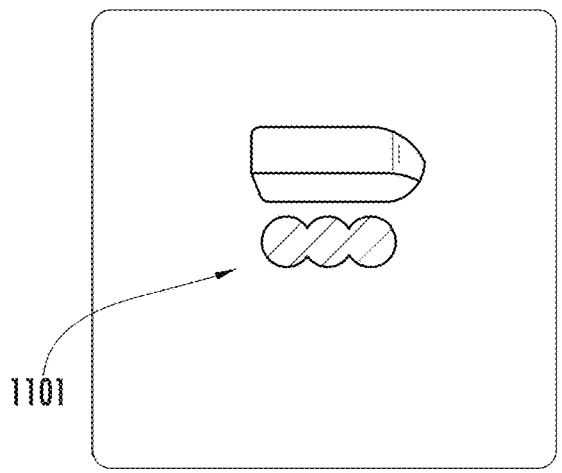
Figure 11E:
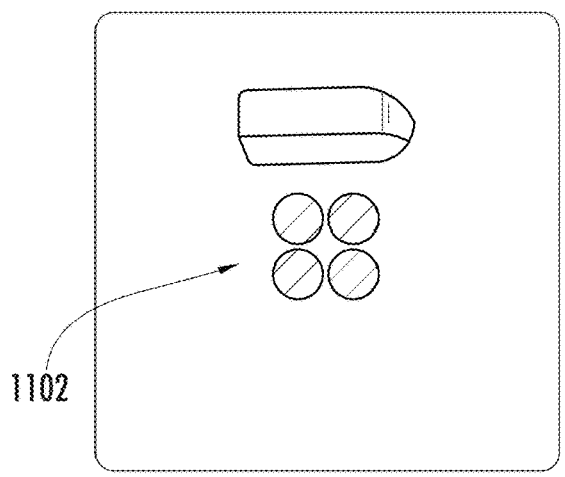
Figure 11F:
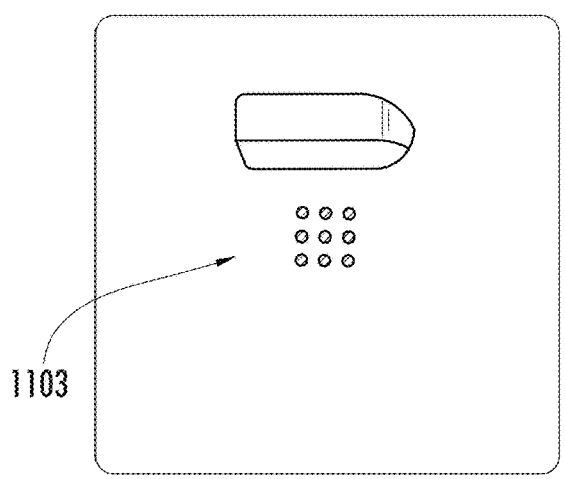

FIGS. 11A-11C schematically illustrate the results. FIG. 11A is representative of three overlapping holes 1101 formed in the substrate, each 10 mm in diameter. FIG. 11B is representative of a 2×2 array of fine pitch holes 1102, each also 10 mm in diameter. It can be seen that the center-center distance between the holes approaches the hole diameter, with close separation between neighboring holes. FIG. 11C is representative of a 3×3 array of 2 mm diameter holes 1103. FIGS. 11D-11F show corresponding images of the processed transparent glass placed on a background. The background is visible through the transparent glass, which is not itself visible in the images. The background includes an elongated whitish element that appears above the array of holes (a rubber eraser) that was used to angle the glass sample to reduce the glare in the photo. Thin white lines are superimposed on the images to enhance visibility of the cut edges and holes formed by the hybrid NS-USP process in the transparent glass.

In this example, processing was carried out as follows: Laser Power (average): USP: 9.5 W @1 MHz, NS: 76 W @1 MHz; Pulse Width: USP: 800 fs, NS: 10 ns (50% points); Imaging: X-Y galvanometer system, f=100 mm lens; Speed, Scan/Processing: 5 meters per second/4 sec for 2 mm holes (diameter), 11 sec for 10 mm holes (diameter); Processing Sequence: USP pre-processing for 1 second, focus at or near surface; NS-USP after USP pre-processing (using optical shutter), as follows: (i) focus at surface for 2-5 seconds, (ii) shift focus below surface (about 100 µm depth) to complete a thru-hole; Laser irradiation on one side of the glass for processing, beam orthogonal to surface; Assist Gas: none; Pulse Temporal Spacing: USP pulse at approximately 50% point of NS leading edge. (spacing approximately zero with NS 50% rise time definition).

The example results demonstrate capability for efficient processing (e.g.: cutting, drilling) of display glass.

By way of example, the NS and USP pulses may overlap, as discussed above. In some embodiments the USP (e.g. fs pulse) may be spaced to lead the NS pulse by a few ns, for example, up to 3 ns, or 5 ns of the 10 ns pulse width (e.g.: up to 30% or 50% of the NS pulse width), provided the desired material interaction occurs. Various USP and NS pulse parameters may be utilized as discussed herein.

In this example USP pre-processing was advantageously used to modify material at or near the surface, followed by focusing deep into the material (e.g., 100 µm) for at least a portion of the NS-USP processing. Accordingly, these experiments show that high quality, fine pitch thru-holes may be rapidly formed in display glass with NS-USP processing.

Processing Speed

When USP only laser machining was utilized, cutting depth (and thus overall processing speed) were effectively limited (e.g.: saturated) when the pulse energy was large, perhaps because of limited heat diffusion length in the material.

Examination of groove depth as a function of scan pass numbers was instructive. The focused spot was scanned by a galvanometer-based scanner along one direction and a linear groove was made by laser ablation. The repetition rate was 100 kHz in this example. When the pulse energy was low (20 µJ), groove depth increased initially, but became limited (saturated) at about 100 µm. When the pulse energy was increased (40 µJ), the saturation depth increased (200 µm). However, the slope of the depth as a function of the number of passes did not change compared with 20 µJ result. The slope became larger only when the repetition rate was increased. These results indicate that the amount of ablated material with single USP pulse could be saturated with a pulse energy of 20 µJ and the selected focusing conditions (e.g.: spot size of about 30-50 µm).

Figure 12:
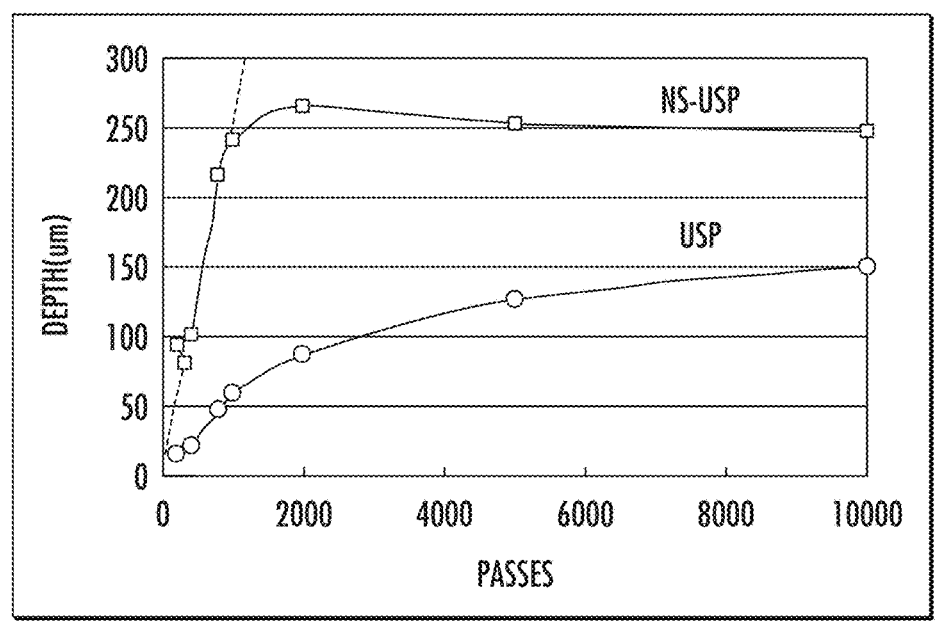
FIG. 12 is a plot comparing examples of USP and NS-USP (hybrid) laser machining speed, illustrating at least about a 5× speed improvement with NS-USP, over a depth range of at least about 200 µm.

FIG. 12 shows a comparison between fs (USP) and hybrid (NS-USP) laser machining speed. The focused spot was scanned as above to form a linear groove by a laser. The groove depth was plotted as a function of the number of scan passes, where the scan speed for all tests was the same. The USP processing was carried out with 15 µJ, 1 MHz, and about 700 fs. NS-USP (Hybrid) processing was carried out with the same USP parameters as above, and with NS configured with 75 µJ, 1 MHz, and about 10 ns pulse width. The slope of the NS-USP processing curve was 6 times steeper than the USP processing curve slope, as illustrated by the straight line approximation (dashed line in FIG. 12). The machining speed was not saturated when the total pulse energy (USP+NS) was increased to 90 µJ. This increase in the slope illustrates the beneficial effect (deeper cut for the same number of scan passes) of adding the NS pulse to the USP pulse (NS-USP process), which contrasts with no change in slope when increasing the USP pulse energy for the USP-only process, as herein

Additional Examples, Applications, Aspects, and Embodiments

Various applications and uses are possible with the systems and methods disclosed herein. These applications and uses include, but are not limited to, cutting and drilling, internal welding, surface modification, and nanoparticle synthesis. For example, clean and fast cuts may be made in tempered glass, non-tempered glass, sapphire, SiC, GaN, semiconductor (e.g., wafers), or hard metals. In one example, non-tempered glass about 100 µm thick was drilled with holes separated by 10 µm. Drilling of tempered glass (e.g., Gorilla® glass) has been described above. Multiple holes can be drilled on brittle material. A variety of shapes can be cut in materials.

Two (or more) materials can be joined directly by internal welding with almost no heat affected zones and/or with reduced or minimal thermal affected area. Materials that can be joined include combinations of glass, metal, and/or semiconductor such as, e.g., glass/glass, glass/metal, glass/semiconductor, semiconductor/metal, and so forth. For example, an interface between these materials can be directly welded by focusing the laser beam at the interface.

Surface modification can improve device quality by providing surface fine structure such as, e.g., surface nano-ripple, fine dimple, selective thin film removal, etc. Femtosecond laser pulses can create unique submicron scale ripple or micron-sized dots on material such as, e.g., metal, semiconductor, ITO, etc. Surface find structure can be used for high strength bonding, active contact surface, optical property control, better light extraction, and so forth. Fine structure can decrease contact resistance between metal and semiconductor, provide improved light extraction in an LED, and assist with organic molecule alignment.

Also, as discussed above, '909, '705, '138, '5387, '493, and '8880 describe additional example applications, methods, processing systems and parameters, and so forth that are usable with embodiments of the systems and methods disclosed herein. For example, embodiments of the systems shown and described with reference to FIGS. 1A and 1B of the present application can be used with the example systems and methods described in '909, '705, '138, '5387, '493, and '8880, which are hereby incorporated by reference herein in their entireties.

In a first aspect, a method for laser-based material processing of a material, the method comprising: generating a first series of laser pulses, each pulse of said first series having a pulse width of at least about 1 ns; and generating a second series of laser pulses, each pulse of said second series having an ultrashort pulse width; and setting a relative temporal spacing between a pulse of said first series with an ultrashort pulse of said second series such that one or more of said ultrashort pulses facilitates depthwise material modification of said material with a combination of said first series of pulses and said second series of laser pulses; and focusing and delivering said first series of pulses and said second series of pulses to said material along a common propagation direction, wherein substantially no material modification occurs with said first laser pulse series alone, and substantially more depthwise material modification occurs with said combination of first series and second series than with either individual pulse series.

In a second aspect, the method of aspect 1, wherein an energy delivered by a focused ultrashort pulse of said second laser pulse series is greater than a single shot damage threshold of said material.

In a third aspect, the method of aspect 1 or aspect 2, wherein an energy delivered by a focused ultrashort pulse of said second laser pulse series is less than a single shot damage threshold of said material.

In a fourth aspect, the method of any one of aspects 1-3, wherein said ultrashort pulses of said second series comprise pulses in the range from about 100 fs to about 10 ps.

In a fifth aspect, the method of any one of aspects 1-4, wherein said pulses of said first series comprise pulse widths in the range from about 1 ns to about 100 ns.

In a sixth aspect, the method of any one of aspects 1-5, wherein said spacing is set such that an ultrashort pulse of said second series overlaps between approximately the 10% point and 90% point of the rising edge of a pulse of said first series.

In a seventh aspect, the method of any one of aspects 1-6, wherein said spacing is set to provide temporal overlap of said pulses.

In an eighth aspect, the method of aspect 7, wherein: a pulse in said first series comprises a pulse width in the range from about 5 ns to 20 ns, said temporal spacing is based on a continuous pre-determined time-window, Δt, which overlaps a rising edge of a pulse from said first series, and overlaps a portion of said pulse from said first series by no more than about 50% of the pulse width in said range from about 5 ns to 20 ns.

In a ninth aspect, the method of aspect 8, wherein said time window is characterized by having a center at about the 50% of maximum intensity point of a pulse from said first series.

In a tenth aspect, the method of aspect 8, wherein a portion of a first pulse which is lower than about 10% of the maximum intensity is excluded from said time window.

In an 11th aspect, the method of any one of aspects 1-10, wherein a pulse series is generated at a repetition rate in the range from about 100 kHz to about 5 MHz, said repetition rate being variable.

In a 12th aspect, the method of any one of aspects 1-11, wherein said first series of pulses comprises pulses having a different pulse width, different pulse energy, or different peak pulse power.

In a 13th aspect, the method of any one of aspects 1-12, wherein said second series of pulses comprises ultrashort pulses having a different pulse width, different pulse energy, or different peak pulse powers.

In a 14th aspect, the method of any one of aspects 1-13, wherein a wavelength of a pulse in said first series or in said second series is in the range from about 150 nanometers to approximately 2 microns, wherein said material is highly transmissive and low absorbing within at least a portion of said range.

In a 15th aspect, the method of any one of aspects 1-14, wherein at least one focused pulse of said first series provides a fluence of at least about 1 J/cm$^2$ up to about 20 J/cm$^2$ focused on or within said material.

In a 16th aspect, the method of any one of aspects 1-15, wherein at least one focused pulse of said second series provides a fluence of at least about 0.25 J/cm$^2$ up and to about 10 J/cm$^2$ on or within said material.

In a 17th aspect, the method of any one of aspects 1-16, wherein said pulses of first series provide material modification over at least a 4:1 range of fluence, as determined by a threshold for material modification up to a level at which undesirable damage to said material occurs.

In an 18th aspect, the method of any one of aspects 1-17, wherein said laser-based method comprises drilling, cutting, scribing, trench formation, or kerf formation.

In a 19th aspect, the method of any one of aspects 1-18, wherein said material comprises one or more of display glass, sapphire, fused silica, quartz crown glass, tempered glass, soda lime glass, non-alkali glass, SiC, silicon, or a multilayer transparent material.

In a 20th aspect, the method of any one of aspects 1-19, wherein said substantial material modification obtainable with said combination comprises material modification depth at least about 5-times greater rate than obtained with a series of ultrashort pulses, and with edge quality similar to that obtainable with a series of ultrashort pulses.

In a 21st aspect, the method of any one of aspects 1-20, wherein a material interaction with an ultrashort pulse of said second series enhances absorption of a pulse of said first series, wherein the first and second series cooperatively provide substantially increased material modification.

In a 22nd aspect, the method of any one of aspects 1-21, wherein said method further comprises: a pre-processing step in which ultrashort pulses are used to form a surface groove in a transparent material prior to delivering said first and second series to said material.

In a 23rd aspect, a method of laser-based micromachining, said method comprising irradiating a transparent material with focused laser pulses to form closely spaced features in said transparent material.

In a 24th aspect, the method of aspect 23, wherein said method comprises optical scanning to deliver focused pulses to said material, said optical scanning comprising a wobble function to controllably vary a width of a machined feature.

In a 25th aspect, the method of aspect 23 or aspect 24, wherein said micromachining comprises laser drilling, and said closely spaced features comprise fine pitch holes.

In a 26th aspect, the method of aspect 25, wherein a center-center spacing between a pair of holes is in the range from about 1.5-5 times a hole diameter.

In a 27th aspect, the method of aspect 25 or aspect 26, wherein said drilling is carried out exclusively with an ultrashort pulsed laser (USP).

In a 28th aspect, the method of any one of aspects 25-27, wherein said drilling is carried out with a nanosecond pulse laser (NS) which generates pulses at visible, near ultraviolet (UV), or near infrared (IR) wavelengths.

In a 29th aspect, the method of any one of aspects 25-28, wherein said drilling is carried out with a combination of ultrashort laser pulses and nanosecond laser pulses (NS-USP).

In a 30th aspect, the method of aspect 29, wherein said method includes the method of any one of aspects 1-22.

In a 31st aspect, the method of aspect 29 or aspect 30, wherein a wavelength of a pulse in said first series of laser pulses or a wavelength of a pulse in said second series of pulses is in the near IR range.

In a 32nd aspect, the method of any one of aspects 29-31, wherein a wavelength of a pulse in said first series of laser pulses or a wavelength of a pulse in said second series of pulses is in visible or near UV range.

In a 33rd aspect, the method of any one of aspects 25-32, wherein at least some consecutively drilled holes are separated by more than a nearest neighbor distance to avoid heat accumulation effects.

In a 34th aspect, the method of aspect 33, whereby a heat accumulating effect resulting in melting or cracking of said transparent material is avoided.

In a 35th aspect, the method of any one of aspects 25-34, wherein said closely spaced drilled holes form of pattern of holes with of overlapping portions.

In a 36th aspect, the method of any one of aspects 25-35, further comprising: a pre-processing step in which ultrashort pulses are used to form a surface groove in a transparent material.

In a 37th aspect, a system for laser-based material processing of a material, the system comprising a first laser source (NS) to generate a first series of laser pulses, each pulse of said first series having a pulse width of at least about 1 ns; a second laser source (USP) to generate a second series of laser pulses, each pulse of said second series having an ultrashort pulse width; and a delivery and focusing system to deliver said first series of pulses and said second series of pulses to said material along a common propagation direction, a controller connected to said first laser source and said second laser source, said controller configured at least to adjust a relative temporal spacing of a pulse of said first series with an ultrashort pulse of said second series, such that one or more of said ultrashort pulses facilitates depthwise material modification of said material with a combination of said first series of pulses and said second series of laser pulses, wherein substantially no material modification occurs with said first laser pulse series alone, and substantially more depthwise material modification occurs with said combination of first series and second pulse series than with either individual pulse series.

In a 38th aspect, the system of aspect 37, wherein an energy delivered by a focused ultrashort pulse (USP) of said second laser pulse series is greater than a single shot damage threshold of said material.

In a 39th aspect, the system of aspect 37 or aspect 38, wherein an energy delivered by a focused ultrashort pulse (USP) of said second laser pulse series is less than a single shot damage threshold of said material.

In a 40th aspect, the system of any one of aspects 37-39, wherein said ultrashort pulses (USP) of second series comprise pulses in the range from about 100 fs to about 10 ps.

In a 41st aspect, the system of any one of aspects 37-40, wherein said pulses of said first series comprise pulse widths in the range from about 1 ns to about 100 ns.

In a 42nd aspect, the system of any one of aspects 37-41, wherein said spacing is set such an ultrashort pulse of said second series overlaps between the 10% point and 90% point of the rising edge of a pulse of said first series.

In a 43rd aspect, the system of any one of aspects 37-42, wherein said spacing is set to provide temporal overlap of said pulses.

In a 44th aspect, the system of any one of aspects 37-43, wherein a pulse in said first series comprises a pulse width in the range from about 5 ns to 20 ns, said temporal spacing is based on a continuous pre-determined time-window, $\Delta t$, which overlaps a rising edge of a pulse from said first series, and overlaps a portion of said pulse from first series by no more than about 50% of the pulse width in said range from about 5 ns to 20 ns.

In a 45th aspect, the system of any one of aspects 37-44, wherein a pulse series is generated at a repetition rate in the range from about 100 kHz to about 5 MHz, said repetition rate being variable.

In a 46th aspect, the system of any one of aspects 37-45, wherein said first series of pulses comprise pulses having a different pulse width, different pulse energy, or different peak pulse power.

In a 47th aspect, the system of any one of aspects 37-46, wherein said second series of pulses comprises ultrashort pulses having a different pulse width, different pulse energy, or different peak pulse powers.

In a 48th aspect, the system of any one of aspects 37-47, wherein a wavelength of a pulse in said first series or in said second series is in the range from about 150 nanometers to approximately 2 microns, wherein said material is highly transmissive and low absorbing within at least a portion of said range.

In a 49th aspect, the system of any one of aspects 37-48, wherein at least one focused pulse of said first series provides a fluence of at least about 1 $J/cm^2$ up to about 20 $J/cm^2$ on or within said material.

In a 50th aspect, the system of any one of aspects 37-49, wherein at least one focused pulse of said second series provides a fluence of at least about 0.25 $J/cm^2$ up and to about 10 $J/cm^2$ on or within said material.

In a 51st aspect, the system of any one of aspects 37-50, wherein said pulses of first series provide material modification over at least a 4:1 range of fluence, as determined by a threshold for material modification up to a level at which undesirable damage to said material occurs.

In a 52nd aspect, the system of any one of aspects 37-51, configured such that operation of sub-components therein is individually or cooperatively adjustable with use of said controller, including pulse characteristics of both said NS and USP sources.

In a 53rd aspect, the system of any one of aspects 37-52, wherein a spatial offset between respective focused pulsed laser beams produced from said first series (NS) and said second series (USP) is about 0.25 of a focused spot diameter ($1/e^2$) or finer.

In a 54th aspect, the system of any one of aspects 37-53, wherein a material interaction with an ultrashort pulse of said second series enhances absorption of a pulse of said first series, wherein the first and second series cooperatively provide substantially increased material modification.

In a 55th aspect, the system of any one of aspects 37-54, wherein said material processing comprises drilling holes in a transparent material, and wherein a center-center spacing between a pair of holes is in the range from about 1.5 to 5 times a hole diameter.

In a 56th aspect, a system for material processing, said system comprising a first laser source comprising a continuous wave (CW) laser source to generate a first series of nanosecond (NS) laser pulses, each pulse of said first series having a pulse width of at least about 1 ns, said first source comprising a first optical modulator disposed downstream from said CW laser and configured to selectively gate said optical modulator; a second laser source comprising a high repetition rate source of optical pulses, said second source comprising a second optical modulator disposed downstream from said high repetition rate source and configured to select optical pulses with said optical modulator at a pre-determined repetition rate for material processing, said second laser source configured to generate a second series of pulses at an output thereof, said second series comprising ultrashort pulses (USP); a delivery and focusing system to deliver said first series of pulses and said second series of pulses to said material along a common propagation direction, and a controller connected to said first laser source and said second laser source, said controller configured at least to adjust a relative temporal spacing between a pulse of said first series with an ultrashort pulse of said second series, said controller generating a control signal to selectively gate said first and said second optical modulators such that NS and USP pulse outputs are generated with said temporal spacing, wherein said ultrashort pulse facilitates depthwise material modification of said material with a combination of said first series of pulses and said second series of laser pulses, wherein substantially no material modification occurs with said first laser pulse series alone, and substantially more depthwise material modification occurs with said combination of first series and second pulse series than with either individual pulse series.

In a 57th aspect, a transparent material having an array of laser machined, fine pitch holes of diameter about 10 mm or smaller.

In a 58th aspect, the transparent material of aspect 57, wherein at least some of the fine pitch holes comprise overlapping portions.

In a 59th aspect, the transparent material of aspect 57 or aspect 58, made by the method of any one of aspects 23-36 or by a method comprising the method of any one of aspects 1-22.

In a 60th aspect, a transparent material processed by the method of any one of aspects 1-36 or by the system of any one of aspects 37-56.

Various aspects are summarized above. It is to be understood that all possible combinations of these aspects are within the scope of this disclosure.

Conclusion

It is to be understood that the embodiments described herein are not mutually exclusive, and elements described in connection with one embodiment may be combined with, or eliminated from, other embodiments in suitable ways to accomplish desired design objectives.

For purposes of summarizing the present disclosure, certain aspects, advantages and novel features of the present disclosure are described herein. It is to be understood, however, that not necessarily all such advantages may be achieved in accordance with any particular embodiment. Thus, the present disclosure may be embodied or carried out in a manner that achieves one or more advantages without necessarily achieving other advantages as may be taught or suggested herein. No feature or group of features is necessary or indispensable for each embodiment.

The example experiments, experimental data, tables, graphs, plots, photographs, figures, and processing and/or operating parameters (e.g., values and/or ranges) described herein are intended to be illustrative of operating conditions of the disclosed systems and methods and are not intended to limit the scope of the operating conditions for various embodiments of the methods and systems disclosed herein. Additionally, the experiments, experimental data, calculated data, tables, graphs, plots, photographs, figures, and other data disclosed herein demonstrate various regimes in which embodiments of the disclosed systems and methods may operate effectively to produce one or more desired results. Such operating regimes and desired results are not limited solely to specific values of operating parameters, conditions, or results shown, for example, in a table, graph, plot, figure, or photograph, but also include suitable ranges including or spanning these specific values. Accordingly, the values disclosed herein include the range of values between any of the values listed or shown in the tables, graphs, plots, figures, photographs, etc. Additionally, the values disclosed herein include the range of values above or below any of the values listed or shown in the tables, graphs, plots, figures, photographs, etc. as might be demonstrated by other values listed or shown in the tables, graphs, plots, figures, photographs, etc. Also, although the data disclosed herein may establish one or more effective operating ranges and/or one or more desired results for certain embodiments, it is to be understood that not every embodiment need be operable in each such operating range or need produce each such desired result. Further, other embodiments of the disclosed systems and methods may operate in other operating regimes and/or produce other results than shown and described with reference to the example experiments, experimental data, tables, graphs, plots, photographs, figures, and other data herein.

Other systems, setups, and parameters may be used in other implementations, which may provide the same or different results. Many variations are possible and are contemplated within the scope of this disclosure. Materials, components, features, structures, and/or elements may be added, removed, combined, or rearranged. Additionally, process or method steps may be added, removed, or reordered. No single feature or step, or group of features or steps, is indispensable or required for each embodiment.

Certain processing steps or acts of the methods disclosed herein may be implemented in hardware, software, or firmware, which may be executed by one or more general and/or special purpose computers, processors, or controllers, including one or more floating point gate arrays (FPGAs), programmable logic devices (PLDs), application specific integrated circuits (ASICs), and/or any other suitable processing device. In certain embodiments, one or more functions provided by a controller or a control means may be implemented as software, instructions, logic, and/or modules executable by one or more hardware processing devices. In some embodiments, the software, instructions, logic, and/or modules may be stored on computer-readable media including non-transitory storage media implemented on a physical storage device and/or communication media that facilitates transfer of information. In various embodiments, some or all of the steps or acts of the disclosed methods or controller functionality may be performed automatically by one or more processing devices. Many variations are possible.

The term "or" is used in this application its inclusive sense (and not in its exclusive sense), unless otherwise specified. In addition, the articles "a" and "an" as used in this application and the appended claims are to be construed to mean "one or more" or "at least one" unless specified otherwise Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. As used herein, a phrase referring to "at least one of" a list of items refers to any combination of those items, including single members. As an example, "at least one of: a, b, or c" is intended to cover: a, b, c, a-b, a-c, b-c, and a-b-c.

Thus, while only certain embodiments have been specifically described herein, it will be apparent that numerous modifications may be made thereto without departing from the spirit and scope of the disclosure. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A method for laser-based material processing of a material, the method comprising:
generating a first series of laser pulses, each pulse of said first series having a pulse width of at least about 1 ns;
generating a second series of laser pulses, each pulse of said second series having an ultrashort pulse width;
setting a relative temporal spacing between a pulse of said first series with an ultrashort pulse of said second series such that one or more of said ultrashort pulses facilitates material modification of said material with a combination of said first series of pulses and said second series of laser pulses;
focusing and delivering said first series of pulses and said second series of pulses to said material along a common propagation direction,
wherein substantially no material modification occurs with said first laser pulse series alone, and substantially more material modification occurs with said combination of first series and second series than with either individual pulse series.

2. The method of claim 1, wherein said ultrashort pulses of said second series comprise pulses in the range from about 100 fs to about 10 ps.

3. The method of claim 1, wherein said pulses of said first series comprise pulse widths in the range from about 1 ns to about 100 ns.

4. The method of claim 1, wherein said spacing is set such that an ultrashort pulse of said second series overlaps between approximately the 10% point and 90% point of the rising edge of a pulse of said first series.

5. The method of claim 1, wherein a wavelength of a pulse in said first series or in said second series is in the range from about 150 nanometers to approximately 2 microns, wherein said material is highly transmissive and low absorbing within at least a portion of said range.

6. The method of claim 1, wherein at least one focused pulse of said first series provides a fluence of at least about 1 J/cm$^2$ up to about 20 J/cm$^2$ focused on or within said material.

7. The method of claim 1, wherein at least one focused pulse of said second series provides a fluence of at least about 0.25 J/cm$^2$ up and to about 10 J/cm$^2$ on or within said material.

8. The method of claim 1, wherein said method further comprises: a pre-processing step in which ultrashort pulses are used to form a surface groove in a transparent material prior to delivering said first and second series to said material.

9. The method of claim 1, wherein said material is transparent, and said method comprises forming closely spaced features in said transparent material.

10. The method of claim 9, wherein said closely spaced features comprise fine pitch holes.

11. The method of claim 10, wherein a center-to-center spacing between a pair of holes is in the range from about 1.5-5 times a hole diameter.

12. The method of claim 10, wherein a diameter of said fine pitch holes is in a range from 100 μm to 10 mm.

13. The method of claim 1, wherein said material processing comprises internally welding said material.

14. The method of claim 1, wherein said material processing comprises welding said material with a second material to directly join the material to the second material.

15. The method of claim 14, wherein either of said material or said second material comprises a glass, a metal, or a semiconductor.

16. The method of claim 1, wherein said focusing and delivering comprises focusing and delivering said first series of pulses and said second series of pulses to an interface between said material and a second material, to weld said material to said second material.

17. The method of claim 16, wherein either of said material or said second material comprises a glass, a metal, or a semiconductor.

18. The method of claim 16, wherein said interface comprises a glass/glass interface, a metal/metal interface, or a semiconductor/semiconductor interface.

19. The method of claim 16, wherein said interface comprises a glass/metal interface, a glass/semiconductor interface, or a metal/semiconductor interface.

20. The method of claim 16, wherein a wavelength of a pulse in said first series or in said second series is in the range from about 150 nanometers to approximately 2 microns, and wherein said interface is between a transparent material and a non-transparent material at said wavelength.

21. The method of claim 20, wherein combinations of transparent and opaque materials are disposed within a device, each combination having an interface therebetween.

* * * * *